(12) United States Patent
Malik et al.

(10) Patent No.: US 8,914,311 B2
(45) Date of Patent: Dec. 16, 2014

(54) BILLING METHOD FOR COPY PATH IMAGES

(75) Inventors: Amal Z. Malik, Pittsford, NY (US); Xing Li, Webster, NY (US); Clara Cuciurean-Zapan, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 7 days.

(21) Appl. No.: 13/335,387

(22) Filed: Dec. 22, 2011

(65) Prior Publication Data

US 2013/0166477 A1  Jun. 27, 2013

(51) Int. Cl.
 *G06F 17/00* (2006.01)

(52) U.S. Cl.
 USPC ........................................ 705/400; 705/7.35

(58) Field of Classification Search
 USPC ................................................. 705/400, 7.35
 See application file for complete search history.

(56) References Cited

U.S. PATENT DOCUMENTS

| | | | |
|---|---|---|---|
| 7,755,800 | B2 | 7/2010 | Malik et al. |
| 7,903,285 | B2 | 3/2011 | Malik et al. |
| 2009/0195800 | A1* | 8/2009 | Malik et al. ..................... 358/1.9 |
| 2009/0226082 | A1* | 9/2009 | Li ............................... 382/162 |
| 2010/0088201 | A1* | 4/2010 | Nagarajan et al. .............. 705/29 |
| 2010/0100505 | A1 | 4/2010 | Campbell et al. |
| 2010/0280929 | A1* | 11/2010 | Coffey et al. ................... 705/34 |

OTHER PUBLICATIONS

Elliot, Michael William, Print Engine Color Management Using Customer Image Content, Rochester Institute of Technology, Rochester, New York, Aug. 2010.*

\* cited by examiner

*Primary Examiner* — Nathan Erb
(74) *Attorney, Agent, or Firm* — Pillsbury Winthrop Shaw Pittman, LLP

(57) ABSTRACT

Disclosed is a processor-implemented method for processing image data of a document using an apparatus. The processor determines pixel classifications and counts for each classification, classifies the image, selects a billing tier for which to bill the image, determines counts of pixels for marking to output the image (e.g., in device dependent space), and then can adjust from the selected billing tier to a different billing tier based on the image classification (e.g., and/or using determined counts of pixels for each classification and determined counts of pixels for marking). Counts of pixels can be adjusted using an offset, or calculated using a combination of the determined counts (e.g., combining counts from both independent and dependent spaces). By adjusting the tier at which to bill data, more accurate billing can be implemented for documents with contone or grayscale image data, for example, with greater customer satisfaction.

28 Claims, 11 Drawing Sheets

CONTROL OF PIXEL COUNTERS WITH NEUTRAL PIXEL DETECTION

NEUTRAL PAGE COUNTERS BASED IMAGE CLASSIFICATION FOR CONTONE COPY BILLING

NEUTRAL PAGE COUNTERS BASED IMAGE CLASSIFICATION FOR CONTONE COPY BILLING

EXAMPLE CATEGORY 3 IMAGES USED TO ALTER COPY PATH BILLING TIERS

BILLING METHOD FOR COPY PATH IMAGES

FIELD

This application generally relates to digital image processing, and in particular, to a system and method for adjusting billing tiers used to bill for outputting documents based on counts of pixels made in independent and/or dependent space.

BACKGROUND

Image data comprises a number of pixels having a number of components that contribute to defining the image, such as color and/or intensity. The image data generally includes various color or gray levels, which contribute to the color and/or intensity of each pixel in the image. Each pixel of the image is assigned a number or a set of numbers representing the amount of light or gray level for that color space at that particular spot, for example, the shade of gray in the pixel. Binary image data has two possible values for each pixel, black (or a specific color) (represented by the number "1") or white (represented by the number "0"). Images that have a large range of shades are referred to as grayscale images. For example, grayscale images have an 8-bit value per pixel comprising 256 tones or shades of gray for each pixel in the image (gray level of 0 to 255). Grayscale image data may also be referred to as continuous tone or contone image data. The pixels in a color image may be defined in terms of a color space, typically with three values, such as RGB—R for red, G for green, and B for blue—or four values, such as CMYK—C for cyan, M for magenta, Y for yellow, and K for black.

The pixels may also be defined in terms of device independent space (e.g., when inputting image data, such as standard RGB (sRGB) or CIE L*a*b) or a device dependent space (e.g., when outputting image data, such as RGB or CMYK). When outputting image data to an output device (e.g., copier, printer, or multi-function device (MFD)), a percentage scale may be used to identify how much ink is employed for a print or copy job. Such information may typically be used for billing a customer for print or copy jobs. For example, some methods employ a billing strategy based on an estimated amount of ink or toner consumption; others bill customers based on a print mode selection (e.g., draft, standard, color, enhanced, etc.) of the output device. In dynamic print-job environments, because printing documents using black ink or toner is less expensive than using colored ink or toner, billing is often based on the amount of color content contained in the job to be printed. In order to bill customers for color printing, color detection is an important feature required in an image path. Color detection is used to analyze documents for presence of color as well as an amount of color in order to bill customers accordingly. Generally, the higher the presence and amount of color in a document, the higher the cost.

Some systems include counting the number of pixels in the image data of the document to be printed. For example, a number of binary pixels associated with the CMYK color planes may be counted to determine a pixel count for each category of color at the time of marking for output in the image path. Generally, with existing color detection and counting methods, a pixel will be labeled as color when the presence of any one of the C, M, and Y signals is detected. U.S. patent application Ser. No. 12/252,391 (published as Patent Application No. 2010/0100505 A1), filed Oct. 16, 2008 by the same Assignee (Xerox Corporation), which is hereby incorporated by reference in its entirety, proposes a way to count color pixels. In solid ink and ink jet products, however, it is desirable to render neutral gray objects with CMYK inks (e.g., create objects that appear gray to the human eye by using a particular combination of C, M, Y, and K, thus enabling higher image quality)). This could substantially decrease the appearance of graininess in large uniform gray areas, such as a gray fill or sweep. For billing purposes, it is not desirable to charge customer for color pixels that were (are) visually perceived as gray. The above-referenced 505 publication, for example, has limitations in handling images that are converted to contone from rendered binary data.

In a typical multi-tier billing system for office as well as production printers or copiers, images are placed into different tiers based on the amount of color content on each page. Placing the image in the correct tier level is important both from the customer's, as well as the company's, perspective. Solid ink jet printer machines render neutral areas of an image with a combination of cyan, magenta, yellow, black (CMYK) toner/ink when printing or copying. This, however, creates problems in billing since these "gray" counts may be composed of color toners that mimic gray but are counted towards color with known methods.

This is because most existing billing systems are based on counting the number of color pixels in the C, M, Y planes, either simultaneously or separately, with some using a fixed offset to compensate for the composite black or gray areas. For instance, a given pixel may be counted as a color pixel when the presence of any one of the C, M, and Y signals is detected—although it may actually be neutral gray. This increases the possibility of a page with composite black or gray to be classified as color, which is undesirable, because the color content results used to determine a billing strategy for a document may be skewed. That is, the color classification may cause selection of a higher cost color billing strategy or a higher billing tier (selected from a multi-tier billing structure). Therefore, the customer may be billed for printing the document at a higher rate even though the output document reflects color pixels that are neutralized or gray. Vice versa, the page or document could be classified as neutral when it contains color. The billing strategy for a document in such a case could also be incorrect, and can result in the user being billed a lesser amount because of a selected lower billing tier. For example, a user or customer might not be billed even though the document contains a billable amount of very colorful pixels.

For example, one known method for calculating color includes determining a percentage of area coverage in a document, and comparing that to predefined thresholds. Documents are then classified based on a percentage color area coverage used. For example, the following show example known calculations used for billing for color documents:

CMYimpressionPixCnt=Any one of the Cyan, Magenta or Yellow Pixel Count of Impression A4maxPixCnt=Maximum Pixel Count Possible for A4 paper size Impression LETmaxPixCnt=Maximum Pixel Count Possible for Letter size Impression % Area Coverage=(((CMYImpressionPixCnt-offset)/ LETmaxPixCnt)×100)

A fixed offset (as noted above) is or can be subtracted from the CMYpixel counts to compensate for the composite gray area coverage.

Other strategies have also been introduced to improve billing of documents. For example, U.S. patent application Ser. No. 12/962,298, filed Dec. 7, 2010 by the same Assignee (Xerox Corporation, which is incorporated herein by reference in its entirety), proposes a hybrid method of counting color pixels by making use of existing hardware in the image path. In one embodiment, the normalized minimum of the two counts, one count from the CIE L*a*b neutral page based counting and the other from the CMYK based counting, is used to derive the billing tier. Another embodiment is to simply use the number of color pixels detected in the CIE L*a*b space to determine the billing tier. The '298 application also proposes a method to perform area coverage based color pixel counting for the copy path. It uses the neutral pixel detection information obtained in CIE L*a*b space to control the counting of color pixels in rendered binary CMYK space.

While methods such that those above can be effective in dealing with composite gray pixels that are generated in the marking stage in solid inkjet systems, they may be limited in tier based systems, because pixels that are rendered neutral may be counted as color (depending on predetermined tier thresholds). Additionally, such methods are limited in handling composite gray originals in the scanning process due to the relatively small context used in neutral pixel detection.

Accordingly, an improved system and method of evaluating an image and determining a more accurate billing tier for documents is desirable. Additionally, the ability to adjust such billing tiers can also reduce errors in billing.

SUMMARY

The herein disclosed embodiments use information from prior art image classification method(s) to adjust billing tiers.

One aspect of the disclosure provides a processor-implemented method for processing image data using an image processing apparatus. The image processing apparatus has at least one processor for processing documents containing image data having a plurality of pixels. The method includes the following acts implemented by the at least one processor: providing a billing structure comprising a plurality of original billing tiers defined by predetermined thresholds at which to bill image data; receiving image data of a document comprising a plurality of pixels; determining pixel classifications and counts of the pixels for each pixel classification in the image data; classifying the image data into a category or class based on the determination of the pixel classifications and the counts; determining counts of pixels for marking to output the image data; selecting one billing tier from the plurality of original billing tiers for which to bill the image data, and adjusting the selected billing tier to a different billing tier for which to bill the image data using at least the category or class of the image data.

Another aspect of the disclosure provides a system for processing image data having a plurality of pixels. The system has an input device for receiving a document containing image data, at least one processing element, and an output device for outputting a document. The at least one processing element processes the pixels of the image data, and each processing element has an input and an output. The at least one processing element is configured to: provide a billing structure comprising a plurality of original billing tiers defined by predetermined thresholds at which to bill image data; receive image data of a document comprising a plurality of pixels; determine pixel classifications and counts of the pixels for each pixel classification in the image data; classify the image data into a category or class based on the determination of the pixel classifications and the counts; determine counts of pixels for marking to output the image data; select one billing tier from the plurality of original billing tiers for which to bill the image data, and adjust the selected billing tier to a different billing tier for which to bill the image data using at least the category or class of the image data.

Yet another aspect of the disclosure provides a non-transitory computer readable medium having stored computer executable instructions, wherein the computer executable instructions, when executed by a computer, direct a computer to perform a method for processing image data, the method includes: providing a billing structure comprising a plurality of original billing tiers defined by predetermined thresholds at which to bill image data; receiving image data of a document comprising a plurality of pixels; determining pixel classifications and counts of the pixels for each pixel classification in the image data; classifying the image data into a category or class based on the determination of the pixel classifications and the counts; determining counts of pixels for marking to output the image data; selecting one billing tier from the plurality of original billing tiers for which to bill the image data, and adjusting the selected billing tier to a different billing tier for which to bill the image data using at least the category or class of the image data.

Other features of one or more embodiments of this disclosure will seem apparent from the following detailed description, and accompanying drawings, and the appended claims.

BRIEF DESCRIPTION OF THE DRAWINGS

Embodiments of the present disclosure will now be disclosed, by way of example only, with reference to the accompanying schematic drawings in which corresponding reference symbols indicate corresponding parts, in which.

DETAILED DESCRIPTION

Figure 1:
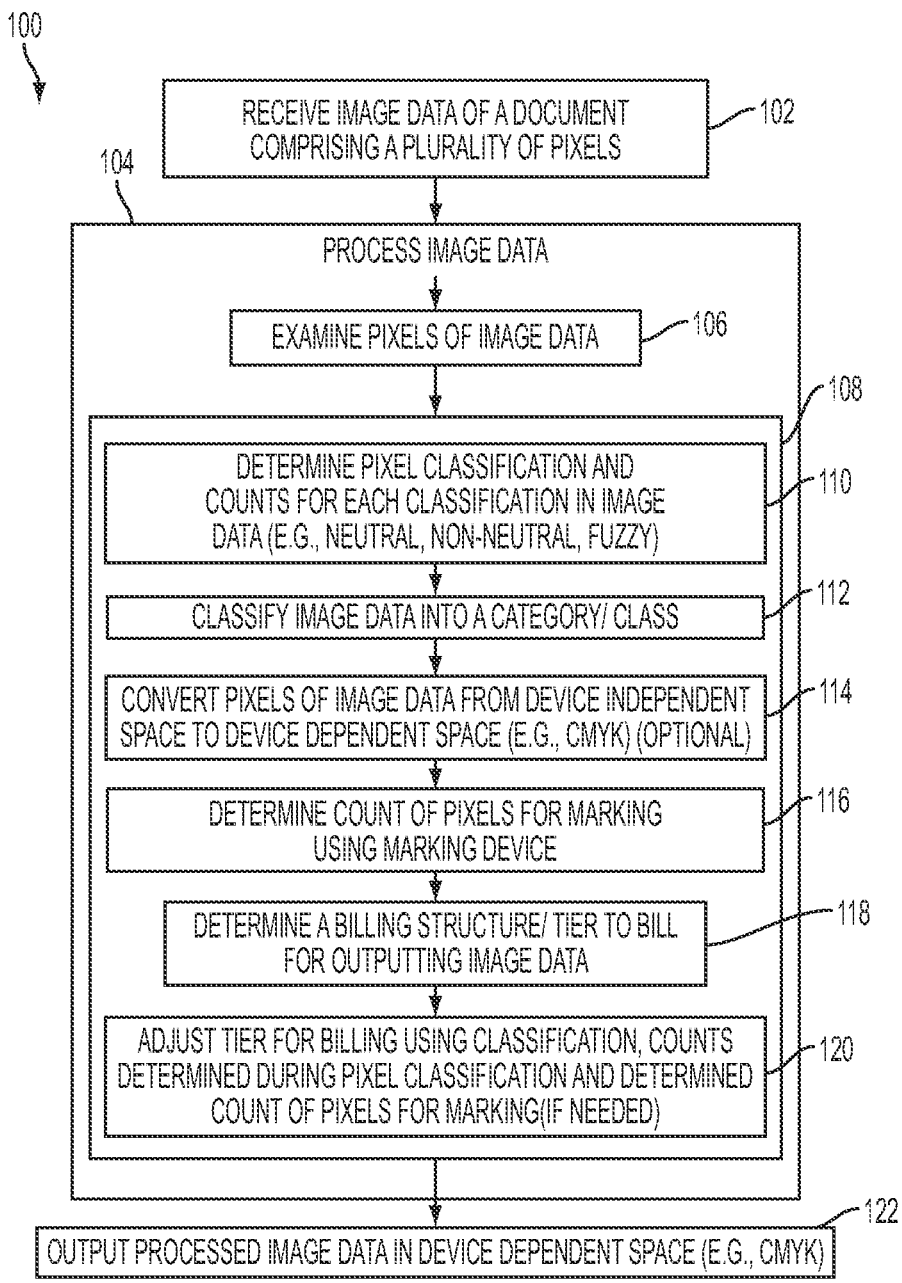
FIG. 1 illustrates a flow chart/block diagram illustrating a method for processing image data and adjusting a tier or tier levels for billing received image data using image classification, determined counts of classified pixels and determined counts of pixels for marking of the image data of a document from image classification in accordance with an embodiment of the present disclosure.

Electronic images are divided into different categories or classes based on the device independent color space of the pixels thereof (based on some prior art). Color categorization counters may be used to count and classify pixels of the electronic image. Classification of images may be based on the amount and kind of color in a document, for example. According to one or more embodiments, this kind of classification/pixel counts aids in adjusting a count of pixels for marking in the image data, and thus a count of pixels that is used for billing and a determination of billing tier/structure for outputting a document. It reduces errors introduced by prior multi-tier billing systems by looking at the counters for marking pixels (e.g., CMY counter) as well as luminance/chrominance color space neutral/color page detection and neutral pixel detection counters, as well as original tier level. It also allows for increased flexibility in billing tiers. The methodology described herein can replace known fixed offsets in systems with an image dependent one. It can also help increase the adoption of color usage in the marketplace.

This disclosure uses algorithms, methods, and processing elements (e.g., hardware and/or software) in multi-function systems/devices to determine and adjust pixel counts, and then adjust billing tiers for documents, taking the above into consideration.

Throughout this disclosure, neutral and non-neutral (i.e., color) pixels and a degree to which they are neutral and non-neutral are used as elements for determining billing structures (and/or estimating billing costs). The term "pixel" as used herein is defined as a pictorial element of data that may be provided in any format, color space, or compression state which is associated with or readily convertible into data that can be associated with a small area or spot in an image that is printed or displayed. An image generally comprises a plurality of pixels having a number of components that contribute to defining the image when it is either printed or displayed.

As used herein, "device dependent" color space (or image data) means color schemes which are tied to or related to color production by a machine, such as printer, scanner or monitor. Many printing or copying machines use additive or subtractive techniques to produce color. Typical device dependent color spaces, for example, include red-green-blue (RGB) or cyan-magenta-yellow-black (CMYK) color spaces. The color gamut is produced by a machine using different combination of these colors.

On the other hand, "device independent" color space (or image data), as used herein, means color schemes which are not tied to color production of a machine. Typical device independent color spaces include, for instance, CIE XYZ or CIE L*a*b* color spaces.

The term "neutral pixel" as used herein is defined as a pixel that is noticeably black (e.g., when output), noticeably white, not having any chroma (i.e., no color), or rendered gray during processing, such when using as black ("K") colorant or a combination of colors and/or black to form composite black (formed from a combination of "CMYK"). A neutral pixel is a pixel that conveys black and white or gray information. With regard to some billing schemes, a neutral pixel is a pixel with one or more of its components (e.g. C, M, Y, K) turned ON and that, when viewed in the context of other (neighboring) pixels, gives the appearance of black or gray. For example, pixels, when output on a document, may be rendered gray using black/composite black ink or toner. Neutral pixels have a chroma value that is about and/or close to 0.

A "color" or "non-neutral" pixel as used herein is defined as a pixel that is typically noticeable or perceptible to the human eye as having color, e.g., when output (copied or printed) on paper. Color pixels have chroma values in excess of zero (0). The term "non-neutral" or "color" pixel as used herein is defined as a pixel that comprises at least one color from a color set (e.g., when output via copy or print) that is perceptible (e.g., to the human eye) and/or recognizable as having color cast. For example, a color pixel may comprise one or more colors such as cyan ("C"), magenta ("M"), and/or yellow ("Y") and be perceived as cyan, magenta, and/or yellow (or other colors) when output. Although neutral pixels can also include a combination of colors, such pixels do not appear (e.g., to the human eye) to have any perceivable color when output, as noted above.

A "degree of neutrality" (or "degree of color") refers to a classification of a pixel with regards to its color (or lack of color). For example, as further disclosed below, a degree to which each pixel is neutral or non-neutral is determined and classified in one of a number of classes (or categories). Such classes may include, but are not limited to: fuzzy neutral, fuzzy color, true color, and/or other classifications that represent a degree of color. A count, amount, or total number of pixels in the image data for each class is determined. In some cases, the count of each class of pixels in the image data can be compared to a total number of pixels in the image data (or document or page). The determined classifications and counts of the pixels (for each identified class) are then used to classify the entire image itself. It is also used in coordination with a count of pixels for marking for updating or adjusting a billing tier level for billing for a document. In some instances throughout this disclosure, the classification or degree of neutrality is referred to as a "kind" of pixel.

A "category" is defined as a classification for image data that is selected to define image data as determined by its pixel attributes and components. Any number of categories may be used to define image data. Categories may be pre-defined or adaptive. In implementations, categories may include more than one type of image, including but not limited to: monochrome, highlight color, low color, and full color, for example. Example categories are further defined below with reference to FIG. 4. Image data that is considered "monochrome" is defined as comprising only of neutral or very very low chroma points. A plurality of pixels of image data that represent "highlight color" comprise some pixels that are neutral and some (different) pixels that have one or more low chroma points. Image data of "low color" comprise a mostly neutral image, with little use of color. Color content of "low color" images could be many low chroma or a few high chroma, but overall there is not much chroma on the page. "Full Color" image data comprises an unrestrained use of any hue/chroma combination.

The categories that are described herein for classifying the image data, which are used to determine a billing structure/adjustment of a billing tier, are exemplary and for explanatory purposes only. The categories used to classify the image (and thus, to bill for the output of the image) can be extended and/or altered in any number of ways. In some embodiments, sub-categories may be used and/or selected for classifying image data. For example, it may be determined that an image is categorized as a full color image without much color (e.g., a low percentage of color pixels) or a full color image that uses lots of color (e.g., a high percentage of color pixels). Accordingly, the number and types of categories used to define the image data are not limited.

Generally, in known output systems/devices (e.g., printers, copiers, MFDs), when a document is to be printed or copied, the document is input into a device and the image data is processed in an image path. For example, with reference to FIG. 1, image data comprising a plurality of pixels is received at 102 and processed at 104. In some instances, if the image data is not already in independent color space then a step of converting the image data to a device independent color space may be optionally performed. In other instances, device dependent image data may be processed.

This disclosure proposes an improved way of determining pixel counts (by using counts of different kinds or types of color pixels in device independent and/or device dependent space), so that pixels that may appear visibly neutral to the human eye are not counted as color when determining a billing tier/structure for a customer or a user. Using existing hardware and/or software in the image/copy path, the following disclosure details how neutral and non-neutral/color detection results in device independent space are used in conjunction with color pixel counting in device dependent space, all based on image classification, to adjust billing tier levels and derive a billing strategy for the image data (of a page or a document) being processed. Although there are exemplary embodiments described herein, it is to be understood that such embodiments are not meant to be limiting, and that other methods or algorithms that use neutral pixel determination in combination with pixel counting based on image classification for billing are within the scope of this disclosure.

In order to reduce or prevent potential billing problems with regards to billing customers for color pixels that do not visually appear to the human eye to contain color, this disclosure provides a method 100 for processing image data, adjusting tiers based on image classification, and determining a billing tier for outputting documents based on at least image classification. In an embodiment, the counts of color pixel classifications of the image data in device independent space and counts of color pixels for marking, as shown in FIG. 1, are used to adjust a selected billing tier for received image data. The method 100 uses calculations/counts made in both device independent color space and device dependent space. Generally, a billing structure is a method by which a charge to a user or customer for printing or copying a document is calculated. A billing structure may be a calculation method associated with or correlated with tiers, thresholds, values, or algorithms, for example. Further details regarding tiered billing structures are discussed below and in the incorporated reference(s). For explanatory purposes, tiers and/or tier levels are interchangeably used as terms throughout this disclosure to represent different categories of images, and billing for said images. The disclosed method/algorithm uses a billing structure having a plurality of original, initial, or first billing tiers, each of the tiers being defined by predetermined thresholds. The tier at which to bill received image data can be adjusted and/or the tiers themselves can be updated. Also, it should be understood that a billing structure can be determined based on a determined tier level, but can also be determined/calculated by including additional information such as a type of customer, type of device being used for output, etc.

In an embodiment, the categories that image data is classified herein throughout correlate or equate to billing tier levels. For example, if an image is classified into a Category 2 image, it may be billed at a Tier 2 level, and the billing tier may be determined based on that categorization, among other things. In another embodiment, the categories can be used to implement sublevels in the billing tiers, or even new tier levels.

In the described example embodiments, a count of neutral and color pixels in the device independent space and a count of color pixels in device dependent space are determined to thus exclude a count of pixels that appear neutral or gray to the human eye (e.g., which are made up of composite black (i.e., contain C, M, Y, and K colorants or medium). For example, even though some color pixels may be output to form grayscale image data, according to this disclosure, the billing tier for a document with such grayscale image data may be chosen based on black printing or copying modes, based on the amount (or lack thereof) of color to be output. In some cases, a method for counting grayscale or composite black as black pixels, such as disclosed in U.S. application Ser. No. 12/246,956, filed Oct. 7, 2008 by the same assignee, hereby incorporated by reference in its entirety, may be employed for processing grayscale image data that is received and processed by the methods disclosed herein. The exemplary embodiments herein are described with reference to counting non-neutral or color (CMY) pixels and without including types of rendered neutral or gray pixels, but should not be limiting. Based on the image classification, the actual color of the pixel (or combination of colors, e.g., in a neighborhood or area) as determined in device independent space is used either directly or indirectly to determine the placement of image into a tier level (and/or if the tier/tier level for billing should be changed). Additionally, these determined color pixel counts (as classified) are used with counts of pixels in the image data for marking (e.g., made by a processor or marking engine) to adjust billing tiers for which documents are billed.

Referring back to FIG. 1, illustrated is a flow chart/block diagram illustrating a method 100 for processing image data and adjusting tier levels for billing using at least image classification and determined counts of classified pixels and determined counts of pixels for marking of the image data of a document in accordance with an embodiment. Each of the method steps that are shown in FIG. 1 and throughout this disclosure may be implemented by one or more computers or processors, for example, and are not meant to be limiting. For example, the elements or modules as shown in FIG. 15 may implement the herein described methods.

Figure 15:
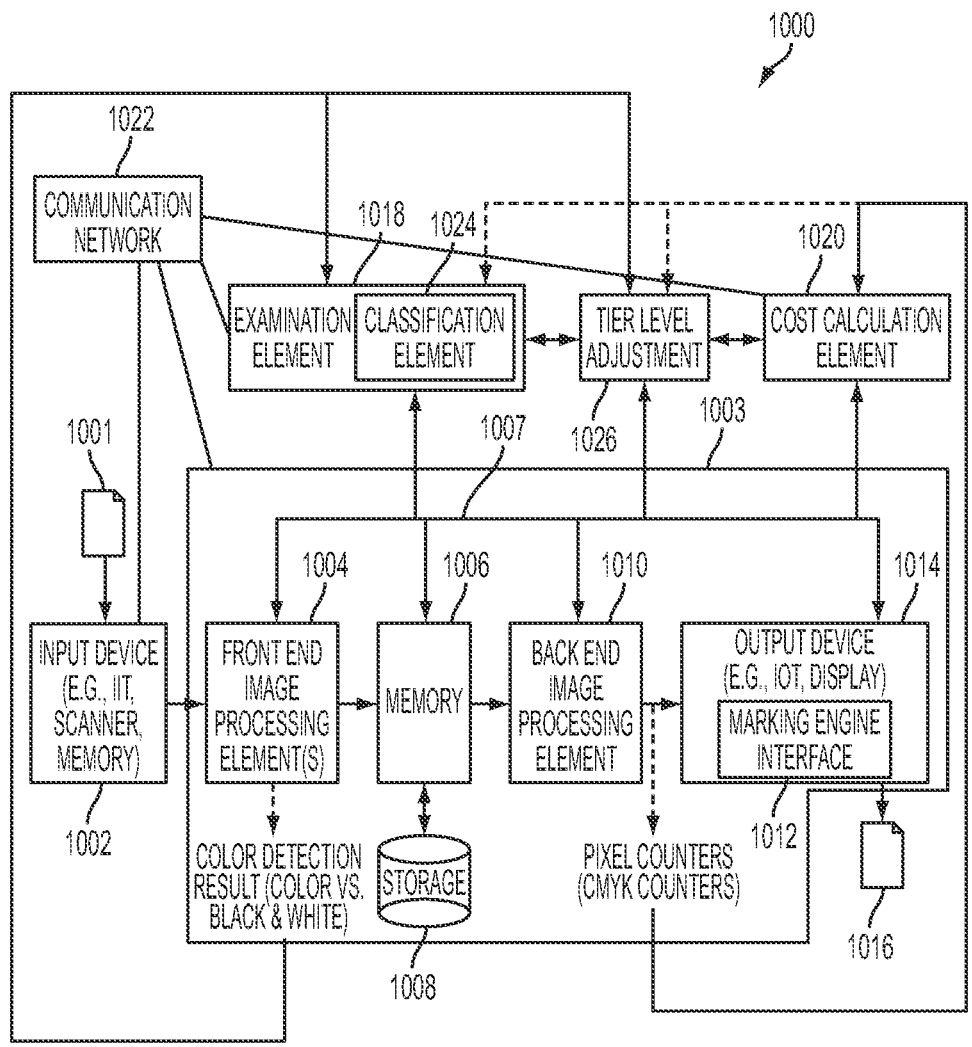
FIG. 15 illustrates an exemplary block diagram of an image path of a system, device, or image processing apparatus, in accordance with an embodiment, comprising at least one processor and an output device, for using the method of FIG. 1.

As previously noted, the method 100 begins at step 102 in which an output device/image processing apparatus/processor (e.g., such as shown in FIG. 15) receives a document comprising at least one page of image data. The image data comprises a plurality of pixels. In some embodiments, the image data is received in device independent space. Alternatively, the image data may be in device dependent space. For example, the image data may be received in contone or RGB color space, or alternatively, comprise black and white pixels. Device dependent color space values, such as RGB and CMYK, may be converted to a device-independent color space, such as CIE L*a*b* color space, using transformation algorithms or a look-up-table (LUT), as known in the art; or, using ICC color management profiles associated with the printing system. The received image data in step 102 is representative of any type of page or document and may include a variety of objects to be detected and used by method 100; however, method 100 may use a document that includes any combination of objects (including text). For example, the document may include objects such as monochrome color text object(s) and/or color text object(s).

The apparatus/processor provides a billing structure having a plurality of original or initial billing tier defined by predetermined thresholds at which to bill image data. These tiers are configured to be used by the processor such that one billing tier is selected and used to bill the image data.

After receiving image data in 102, the image data is processed at 104. Such processing may include transforming the input image data into device independent color space, for example, if the image data is not already in device independent color. Techniques for converting image data from a device dependent color space to a device independent color space are well-known in the art and therefore not discussed in detail herein.

The pixels of the image data, in device independent color space, for each page of the document are then examined at 106. At 108 processing steps are applied. As shown, the processing at 108 can include determining at 110 pixel classification(s) and count(s) of the pixels for each classification in the image data. For example, each of the pixels can be analyzed and/or processed to determine if the pixels in the image data are neutral or non-neutral (and/or any other pixel classifications levels) (i.e., color). That is, each pixel can be analyzed, either in device independent space (e.g., CIE L*a*b, YCbCr) or in device dependent space, to determine a degree of neutrality (a degree to which each pixel is neutral or non-neutral), and then classified in one of a number of classes (or categories). Such classes may include, but are not limited to: neutral, fuzzy neutral, fuzzy color, non-neutral, true color, and/or other classifications that represent a degree of color. A count or total number of pixels in the image data for each class is determined. In some cases, the count of each class of pixels in the image data can be compared to a total number of pixels in the image data (or document or page). In accordance with an embodiment, a classification method such as disclosed in U.S. application Ser. No. 13/229,354, filed on Sep. 9, 2011, and assigned to the same assignee (Xerox Corporation), which is hereby incorporated by reference in its entirety, is used for the determination and pixel classification at 110. The determinations for pixel classification and counts at 110 for each classification may be determined by applying a neutral pixel determination algorithm and/or a neutral page determination algorithm to the image data in device independent space. In one embodiment, a neutral pixel determination method as disclosed in U.S. Patent Application Publication No. 2009/0226082 A1 (U.S. application Ser. No. 12/042,370), filed Mar. 5, 2008, published Sep. 10, 2006, and assigned to the same assignee (Xerox Corporation), which is herein incorporated by reference in its entirety, is used for the determination and pixel classification at 110. However, the methods or steps for determining if a pixel is neutral (or not) or the degree to which it is neutral/color should not be limiting. Any number of neutral pixel or neutral page determination methods may be implemented with this disclosure that currently exist or that are developed in the future. Moreover, the type(s) and number of classes for classifying the pixels is not limited. In some instances, the type(s) and number of classes can be determined based on the type of machine or device being using for printing or copying. Accordingly, the classes described and illustrated herein are for explanatory purposes only, and it should be understood that alternative and/or additional classes may be used to classify the pixels of data.

Upon determining the pixel classification (degree of neutrality) and counts of each classification of the pixels in the image data, the image data (of the document or page) may then be classified at 112. That is, the image data of the whole page or document itself may be classified based on the pixel classification and counts determined at 110 (e.g., using the method disclosed in the above-noted and incorporated '354 application). The image data is classified into a category or class based upon the pixel classification and counts. As further discussed below, any number of pixel and image classification methods may be implemented in this disclosure.

After the image data is analyzed at 110 and classified at 112, it may be further processed. It can be optionally converted from device independent space to device dependent space, as shown at step 114, for example.

In an embodiment, the pixels of image data are converted to device dependent space at 114. Then, at 116, a count of pixels for marking (e.g., using a marking device in an apparatus or system) is determined. That is, in an embodiment, the count of pixels is made in a device dependent space (e.g., dependent upon a select marking device). For example, the determined count of pixels for marking may comprise counting a number of C, M, and Y pixels in the image data for marking (e.g., onto a page).

A billing tier is determined or selected from the plurality of original billing tiers at 118 using any number of methods. "Original" billing tier in this context is a billing tier determined by any tiered billing method. For example, the method can use marked pixel counting and/or an amount of ink consumption to determine a possible tier for billing. In one embodiment, an original (selected) billing tier is a tier that determined by any method applied in a device independent space but not a combination of the above (i.e., marked pixels+device independent space information).

At 118, a selected billing tier level for billing is adjusted (if needed) using at least the category or class of the image data. That is, the image classification itself may be used to adjust from the selected billing tier to a different billing tier. In accordance with an embodiment, the calculations used for image classification are used to adjust a selected billing tier. For example, as shown in FIG. 1, in an embodiment, the determined counts of pixels for each determined pixel classification (determination at 110) and the determined counts of pixels for marking (determination at 116) (e.g., based on the counts). As will be described in the examples detailed further below, in accordance with some embodiments, the counts can be used in combination with each other, or used for adjustment of count(s), and/or used for determining a count of pixels that is used to determine a billing tier and a cost for billing for output of the document image data. Both counts can be used to adjust the tier levels at 120.

For example, an image can be classified into a category based on a pixel count of at least the pixels determined to be color (and/or some degree of color, e.g., fuzzy color, true color) in the device independent space (the billable pixels being those of some degree of color). The category determined at 110 can be used to determine an original billing tier level to which a bill for the received image data can be generated. However, as is disclosed herein, this original billing tier level is designed to be updated—if necessary—by including a count of pixels for marking determined in the device dependent space. That is, the billing tier is designed to be adjusted so that a more accurate bill for outputting received image data is produced. In all embodiments, the classification of the image data is used in conjunction with pixel counts either in device independent or device dependent color spaces, or a combination of both to more accurately adjust the billing tier levels. Such counts may be calculations that are used to determine an image class or category, for example. Thus, additional calculations to adjust a billing tier do not necessarily need to be made.

Optionally, after the billing structure is determined at 120, the processed image data may be marked and output at 122 using a marking/output device.

In the above method, the tiers of the billing structure for billing for outputting the page(s) of a document is based on at least a combination of available counters in an image path. The billing structures and number of tiers used with the image processing apparatus or output device should not be limiting. In an embodiment, it is envisioned that the billing tiers may be determined or based on a threshold value. For example, in an embodiment, the chosen or determined billing structure is based on a selected billing tier which has been defined (or re-defined) based on counts of pixels, as compared to a threshold. That is, the page or document may be billed by choosing a billing structure associated with a tier (e.g., Tier 1, Tier 2, Tier 3) that satisfies the thresholds. One or more thresholds may be used to separate billing tiers which may be used to charge a customer. Such multi-tier billing plans provide options to the customer that better match types of printed or copied documents and workflows. Additionally, two-tier and three-tier meter billing plans may replace black-only and color-only billing structures, which is more satisfactory for the customer and supplier.

According to one or more embodiments, a multiple tier billing methodology for color image copying is disclosed which is adjustable and/or flexible, and reduces errors in billing for documents with contone and/or grayscale image data, typically due to improper neutral classification as seen in prior conventional billing methods. Pixels in the images are processed and counted in a device independent color space and a device dependent color space, and used to adjust billing tiers. By looking at the counters for marking pixels (e.g., CMY counter; device dependent) at least in view of luminance/chrominance color space neutral/color page detection and neutral pixel detection counters, results for billing for color pixels that appear as color to the human eye are improved. It also allows for adjustment in billing tiers, e.g., by creating sub-tiers.

Different billing methods can then be selected and applied to each image, e.g., after billing tiers are adjusted. Because this approach is based on an image content dependent method, which takes into account many if not all available parameters used to determine color content, it produces more accurate billing results for the image data that is processed and marked for output. Using counters from multiple neutral detection sources in conjunction with each other and with counters from the marking engine also provides improved accuracy for billing.

As an example, the 3-tier color distribution may include: neutral color, everyday color, and expressive color use. Documents determined to be of neutral color may include image data comprising no color (i.e., black and white image data) to a very small amount of color, where the amount of color is less than a threshold CMY_TH1. Documents of everyday color may include image data comprising color that is greater than threshold CMY_TH1 and less than a threshold CMY_TH2, wherein CMY_TH2 is a threshold greater than CMY_TH1. Documents of expressive color may include very colorful images, wherein a color amount of the document is greater than threshold CMY_TH2. As understood by one of ordinary skill in the art, the thresholds CMY_TH1 and CMY_TH2 may be predetermined or dynamic thresholds that are used for analysis of the image data. For example, in an embodiment, the thresholds CMY_TH1 and CMY_TH2 may comprise three (3) and ten (10) percent (%), respectively. Further discussion regarding such thresholds is provided in the incorporated '298 application, for example.

In accordance with an embodiment, the three tiers may be defined as follows: Tier 1: all black and white documents and documents with a small amount of color are billed at black and white rate (e.g., neutral, level 1 impressions); Tier 2: documents with more than a small amount of color but less than a large amount of color are billed at a lower than market color impressions rate (e.g., everyday color, level 2 impressions); Tier 3: documents with large amounts of color that are billed at a competitive market color impressions rate (e.g., expressive color, level 3 impressions). However, this example is not meant to be limiting and could extend to N-tier level billing systems. To determine such tiers, break-points, percentages, or thresholds may be used. In some embodiments, the thresholds for dividing the tiers are based on the categories for classifying the image data. These categories can be defined by threshold(s) which are used for comparison with different kinds and amounts of color pixels. In an embodiment, the thresholds for dividing the image into tiers may be based on a percentage of color, e.g., a kind and amount of color pixel compared to a total amount of pixels in the image data. However, the counts or thresholds and methods of defining the counts or thresholds that are used to determine the categories and thus the tiers (e.g., ratio, percentage, pixel count) should not be limiting. Moreover, it should be understood that the billing tier levels can also be adjusted accordingly.

Figure 2:
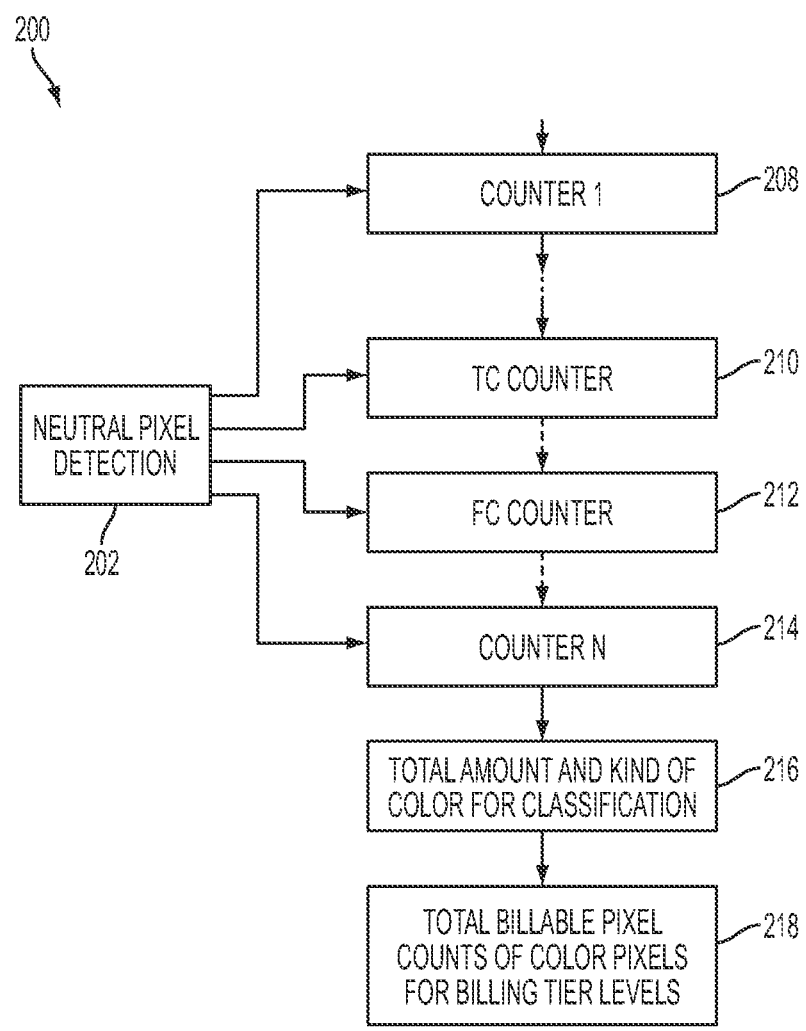
FIG. 2 illustrates exemplary control diagram of counters for pixel counting of pixels determined to be of selected pixel classifications.

FIG. 2 illustrates exemplary control diagram 200 of counters for pixel counting for determining pixels to be used for adjusting billing tier levels (e.g. at 118 in method 100). In the illustrated embodiment, a contone domain neutral detection result (either device independent such as CIE L*a*b space or device dependent space such as CMYK) may be used to control the counting. A neutral pixel detection calculator 202 may be provided to determine if pixels are neutral or non-neutral. It can further be extended to determine other classes such as the fuzzy neutral, fuzzy color, true color, and true neutral pixels, or any other levels of pixel classification. In an embodiment, a neutral pixel and/or neutral page detection method is implemented on the image data in device independent space (such as CIE L*a*b color space). That is, a neutral pixel and/or neutral page detection method may be implemented as part of the determination of pixel classification and counts of each classification as shown at 110 in method 100. Generally, neutral page detection methods are used to determine the class and amount of color content that a page contains. For example, pixels may be analyzed using a reduced image and a window and neighboring pixels (of a pixel of interest) to determine if a pixel/page is detected as neutral or non-neutral. For example, in an embodiment, pixels may be compared against a set of thresholds, and a number of pixels exceeding the set of color thresholds may be determined. Those pixels that exceed the set of thresholds may be used for the color count and/or to determine if a page is neutral. In another embodiment, a ratio of the pixel counts (e.g., compared to a total number of pixels in the image data)(or percentage based on the total amount) can also or alternatively be used to compensate for the scaled image and to have a count comparable to the CMYK counters. In another embodiment, neutral page counters coming from a scaled image could be used in conjunction with the neutral pixel counters to ensure better accuracy. In an embodiment, the method(s) described in the above-mentioned incorporated '082 application may be used for neutral pixel detection at 202, for example.

As represented by neutral pixel detection box 202, after classification of each pixel into a class, each of the classes of pixels are counted using counters 208-214. The number of counters 208-214 may relate to the number of classification levels of pixels, and should not be limited to those illustrated.

For example, any number 1 to N+2 of counters Counter 1 208 through Counter N 214 may be provided. In an embodiment, at least a true color (TC) counter 210 and a fuzzy color (FC) counter 212 are provided, as shown in FIG. 2. Each counter may be incremented by one for each occurrence thereof, for example. As used herein, "true color" means a pixel having color which corresponds to actual or noticeable color by the human eye. In other words, the pixel color includes some chroma. "Fuzzy color" means a pixel having color which is not definitive of actual color or discernable by the human eye. These may correspond to rendered neutral pixel colors, composite black, as well as neither very neutral, nor very colorful pixel counts. For example, in an embodiment, fuzzy pixels may have a chroma range between ±15 and ±25.

The TC counter 210 and FC counter 212 may be provided with or without any additional number of counters 208-214. In an embodiment, the counters 208-214 may be one or more image feature counters, such as, for example, a very colorful counter, color counter, highlight counters, fuzzy neutral counters, saturated color and non-saturated color counters.

In an embodiment, a 2-bit tag (true neutral pixel, fuzzy neutral pixel, true color pixel, fuzzy color pixel) is dumped out by neutral pixel detection module 202 to generate and/or control the counters 208-214.

Each count of the counters 208-214 may be used to determine the total amount and kind of color for classification, indicated at 216 (i.e., determine the pixel counts and classifications). For example, the determination at 216 of the amounts and kinds (counts and classes) of color pixels may be used for the method 300 shown in FIG. 3 (incorporated from the '354 application) to classify the image data into a category. In an embodiment, the counters 208-214 are also to be used to determine the total billable pixel counts of color pixels for adjusting the billing tier levels, as indicated by 218. For example, in an embodiment, the total pixel counts of color pixels at 218 may be used in combination with the counts of the marking engine to adjust billing tier levels (if needed). The counters 208-214 may vary and the information obtained from the counters may be used for other processes and/or methods.

In accordance with an embodiment, similar counters to those shown in FIG. 2 may be provided as C, M, Y, and K counters (from device dependent space) and used for the determination of counts of pixels for marking (e.g., at 116 in method 100) by a marking engine.

Determining Pixel Classification and Counts (e.g., at 110)

The description below discloses one exemplary embodiment incorporated from the incorporated '354 application that may be implemented by one or more modules in an apparatus for determining pixel counts that are used to classify the image data into a category or class. However, this classification method is exemplary and its use is not exclusive or required. That is, this disclosure may use any number of alternate classification methods that are known or determined at a later date to classify received image data. The method for classifying image data is not limited to that of the '354 application.

As such, in accordance with an embodiment, the class and count determination is made at 110 in method 100 in FIG. 1 during the processing in 108, for example. The detection or determination may be performed by a controller or processor (e.g., front end image processing elements 1004, as shown in FIG. 15) on a reduced image to save memory, for example. The determination of pixels for classification and counting, however, is not limited to the below-described embodiment.

In this embodiment, the count of pixel classes (e.g., neutral and non-neutral pixels) in the image data of a page (or document) may be determined at 110 based on determinations including image reduction, chroma calculation, luminance-based threshold adjustment, and a final count determination. Each determination may be performed (using modules or processing elements such as those shown in FIG. 15) as follows:

Image data is provided in device independent color space (having been received or converted thereto) for processing, such as, for example, CIE L*a*b color space, or any other luminance-chroma based color space image data (not necessarily device independent). Detection may be performed on pixel-by-pixel (for pixel p=1 to total_pixels) basis, for example. Then pixels, or groups of pixels, are categorized as being true color or fuzzy color, and counted (e.g., using counters in FIG. 2) for each image/document.

In some instances, the image data may be optionally reduced so as to lower memory requirements during processing. For example, in one embodiment, the image data may be reduced by eight times (8×) in the fast scan direction and by four times (4×) in the slow scan direction.

For every discrete 8 pixel block in an input scan line, pixels are accumulated, divided by two to reduce memory requirements. For instance, halfSum may be limited to 10 bits, in some embodiments:

$$\text{halfSum}(P_n+P_{n+1}+P_{n+2}+P_{n+3}+P_{n+4}+P_{n+5}+P_{n+6}+P_{n+7}+1)\!>\!>\!1,$$

where n=i*8; and i is defined as the block number, i.e., block 0, 1, 2 . . . total_pixels/8

Then for each block i, the block sum over four scanlines is accumulated as follows:

$$\text{sumBuf}[i]=\text{sumBuf}[i]+\text{halfSum}$$

In hardware, sumBuf[i] is held reset for the first scanline and for every fifth line which follows.

After the block sum sumBuf[i], has been accumulated over 4 scanlines, the average video value for that block is calculated by rounding up and then dividing by 16 (since values had previously been divided by 2):

$$\text{avg}[i]=(\text{sumBuf}[i]+8)\!>\!>\!4$$

This average block value can be updated on every fourth scanline once every 8 pixels, i.e. once the sum of a block of 8 pixels by 4 lines has been accumulated.

For each block location, i, there will be three average values, one for each color plane, e.g., for CIE L*a*b color space: avg_L[i], avg_a[i], and avg_b[i].

Chroma Calculation

The chroma of each pixel may be calculated as follow on a pixel-by-pixel basis:

$$\text{chroma}[p]=\max(|\text{avg}\_a[p]-\text{offsetA}|, |\text{avg}\_b[p]-\text{offsetB}|)+[\min(|\text{avg}\_a[i]-\text{offsetA}|, |\text{avg}\_b[i]-\text{offsetB}|)]/2$$

Alternatively, the chroma of each pixel block in the reduced image may be calculated as follow on a pixel-by-pixel basis:

$$\text{chroma}[i]=\max(|\text{avg}\_a[i]-\text{offsetA}|, |\text{avg}\_b[i]-\text{offsetB}|)+[\min(|\text{avg}\_a[i]-\text{offsetA}|, |\text{avg}\_b[i]-\text{offsetB}|)]/2$$

where offsetA and offsetB are values ranging from 0 to 255. Typical values for offsetA and offsetB are 128, though they are not limited. These variables can be programmable, in some instances.

Luminance-Based Threshold Adjustment

The chroma values calculated for each pixel block are compared against a pair of thresholds parameters, c1 and c2. These threshold parameters c1 and c2 are scanner dependent, and may vary with scanner to scanner variation and the outputs as desired by the program. The value c1 is luminance dependent. In one implementation, the three most significant bits (MSB), i.e., left—most bits—of avg_L[i] values (in binary) are used as the index to a programmable threshold look up table (LUT). Table 1, below, includes exemplary LUT values for threshold parameter c1. Of course, the luminance-based threshold adjustments may also be performed on a pixel-by-pixel basis.

TABLE 1

| 3 MSBs of avg L[i] | c1 |
|---|---|
| 000 | 9 |
| 001 | 8 |
| 010 | 7 |
| 011 | 6 |
| 100 | 6 |
| 101 | 6 |
| 110 | 6 |
| 111 | 5 |

The threshold, c2, may be calculated as follows:

$$c2 = c1 + deltaC,$$

where deltaC is a programmable value from 0 to 31.

The range of c1 and c2 may be between 0 and 31, for example, in one or more embodiments. The chroma values calculated above are compared against the thresholds c1 and c2. Values greater than 31 may be likely to be noticeable to users (as they represent very colorful images). In an embodiment, typical values for c1 may include or be between about 5 and about 10, and typical values for c2 may include or be between about 10 and 50 (although, it will be appreciated that other values may also be used in other implementations).

Final Determination of True Color (TC) and Fuzzy Color (FC) Counters (at 110)

The two counters, TC and FC counters 212 and 214, are used to record the number of pixel blocks that meet certain conditions. If the chroma value is between the two thresholds, c1 and c2, then the FC will be incremented by 1 (represented by ++ below); if the chroma value is greater than the second threshold, c2, then the TC counter will be incremented by 1 (represented by ++ below):

if (chroma[i]>c1&chroma[i or p]<=c2)
        FC++
    else if (chroma[i]>c2)
        TC++

Of course, the TC and FC counters may also be executed on a pixel-by-pixel basis in any number of luminance-chroma based color spaces (e.g., L*a*b, YCbCr).

Once all pixels or blocks of pixels of the image data have been classified and counted, the combined results from TC and FC counters, i.e., the total amount and kind of color for classification in 216 of FIG. 2, can be used to determine a total billable pixel counts of color pixels for the billing tier levels (and adjusting the same, if needed).

Again, as noted above, it should be understood that more or alternate counters could be introduced to improve accuracy.

Figure 3:
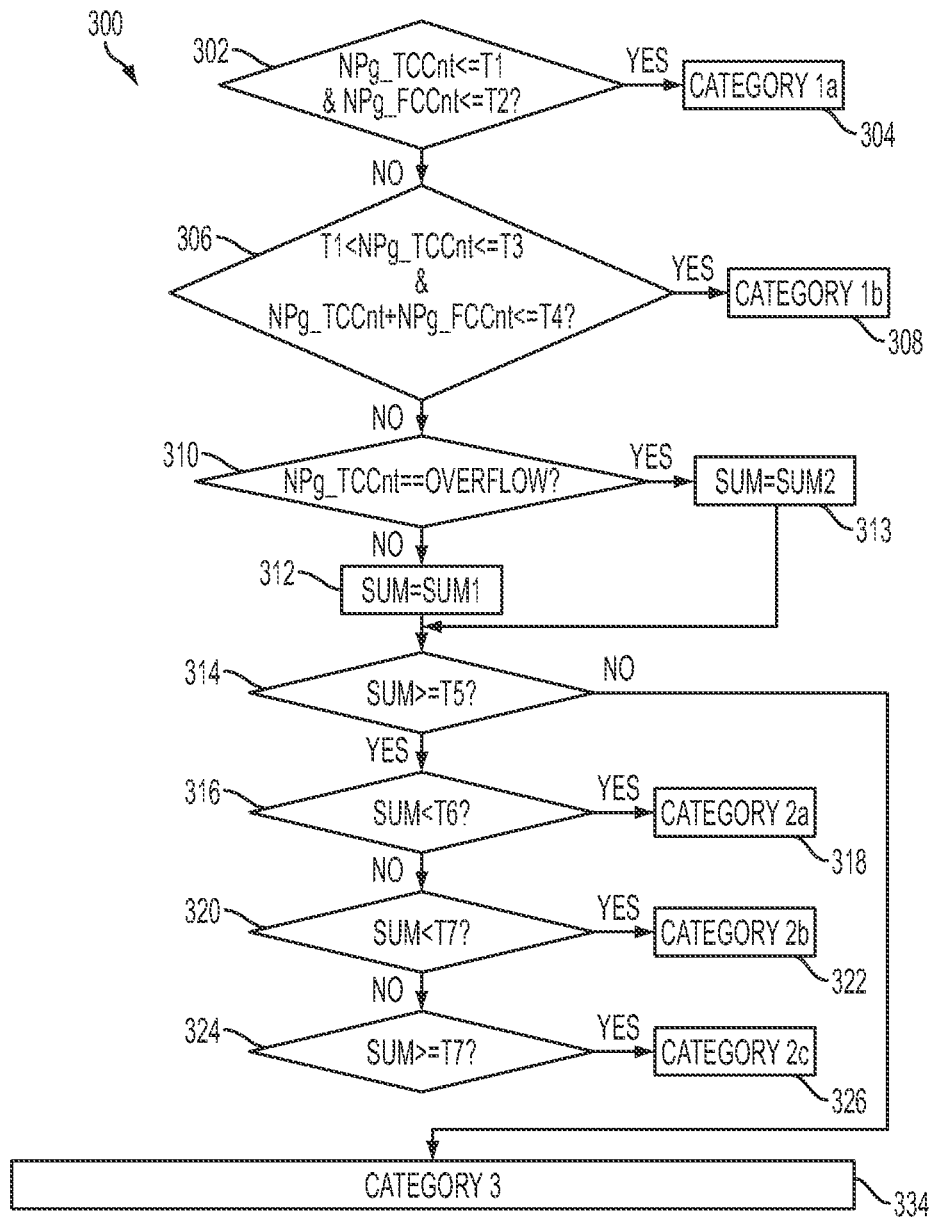
FIG. 3 illustrates a flow chart/block diagram illustrating an exemplary method for classifying image data of a document into a category using color pixels counts and thresholds.

In an embodiment, pixels of the image data (in device dependent space) may be optionally classified into three or more different categories or classes (e.g., Category 1, Category 2, and Category 3) and/or subclasses at step 112 in method 100. FIG. 3 illustrates a flow chart/block diagram illustrating a method 300 for classifying the pixels of image data of a document into a category using color pixels counts, classifications, and thresholds as determined at 110. The classification performed by this flow chart is determined and implemented in step 112 of method 100, for example, and is later used to adjust the billing tiers in step 118 along with a count of pixels for marking. In implementations, the image may be classified as neutral, some color, or very colorful. The categories (1, 2, and 3) that are illustrated and used to classify the image data are exemplary and for explanatory purposes only, and can be extended and/or altered.

Figure 4:
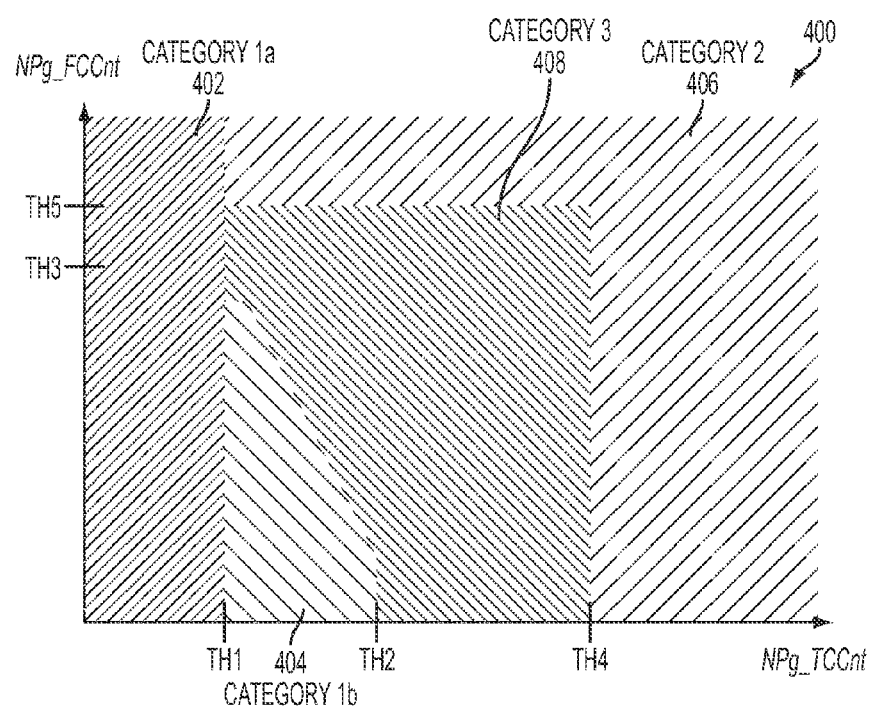
FIG. 4 illustrates another graphical representation of image classification based on pixel classification and counting.

FIG. 4 illustrates a graphical representation of another way of classifying the image into categories based on pixel classification and counting and comparison of these counts with thresholds, as taken from the incorporated '354 application. Again, the classifications can be extended and/or altered to apply this method to adjust to N-tier billing systems, in accordance with some embodiments, and therefore the illustration is not meant to be limited. Specifically, graph 400 shows neutral page fuzzy color count versus neutral page true color count with noted thresholds TH1, TH2, TH3, TH4, and TH5. The graph 400 also shows a possible split into categories of all the possible values of (true color count, fuzzy color count) pairs according to the determinations made in device dependent space/by the neutral determination methods. Categories 1a and 1b (which may be subcategories of Category 1), 2 and 3 are generally located and considered for defining the billing tiers. The following is a general description for the types of images that are classified in the illustrated categories:

1. Category 1: Images for which True Color and sometimes Fuzzy Color counters are less than some pre-determined threshold are classified as neutral images. In FIG. 4, the regions 402 and 404 show this case.
2. Category 2: Very colorful images for which the sum of the True Color and Fuzzy color counters are greater than some pre-determined threshold as shown in region 406 of FIG. 4. This class may be further subdivided into 3 categories 2a, 2b, and 2c based on the sum of the two counters, when combined and/or used with a pixel count made by the marking engine. A fraction of either the two counters or only the fuzzy color counter could also be added to evaluate this sum.
3. Category 3: Images that do not fall in any of the two above categories. Region 408 in FIG. 4 represents this case.

In accordance with an embodiment, the calculations that are used for classification of the image data, as illustrated in method 300 of FIG. 3, are defined as follows:

NPg_TCCnt=Neutral Page True color count (i.e., count from TC Counter 212);

NPg_FCCnt=Neutral Page Fuzzy color count (i.e., count from FC Counter 214);

SUM1=NPg_TCCnt+MF1*NPg_FCCnt; and

SUM2=NPg_TCCnt+MF2*NPg_FCCnt, where MF1 and MF2 are multiplication factors, and MF1≥MF2.

NPg_TCCnt and NPg_FCCnt could relate to the counts determined by the counters 208-214 from FIG. 2, for example.

In some instances, the values for multiplication factors MF1 and MF2 may be 0.75 and 0.8, respectively. These values may be selected to compensate for clipping of FC and TC counters in the hardware of the system, for example, or for larger sized images or documents. However, weighting factors are optional and need not be used. Additional information may be found in the incorporated '354 application, for example.

After the neutral page true color count (NPg_TCCnt), neutral page fuzzy color count (NPg_FCCnt) and sums are calculated, they can be compared to a number of thresholds T1-T7 as shown in the method of FIG. 3. Such thresholds T1-T7 may be programmable parameters that are based on the desired levels of image classification. This may, for example, provide a more accurate classification of images resulting in a better final tier placement of the CMYK images as will be discussed later, since the final output may be an unscaled image. Weighting factors as explained above can help in the correlation expression if the neutral page or neutral pixel algorithm is applied on a scaled image with scaled counters coming out of those modules, for example.

The method 300 of FIG. 3 may be implemented for each page of image data. The true color count TCCnt and the fuzzy color count FCCnt can be determined, where TCCnt and FCCnt can be the same as NPg_TCCnt and NPg_FCCnt, respectively, or they could be a combination of both—they can be the maximum of the two counters, or the minimum, or a fractional sum of the two. In another method, as shown in FIG. 4, it could be only NPg_TCCnt being less than some very small threshold number TH1. In another method, they can be amount(s) from one or more counters such as those described with respect to FIG. 2 (e.g., true color (TC) counter 210, fuzzy color (FC) counter 212).

Method 300 starts at 302 by comparing the true color count NPg_TCCnt to a first threshold T1 and the neutral page fuzzy color count NPg_FCCnt to a second threshold T2. If the counts NPg_TCCnt and NPg_FCCnt are both less than or equal to their respective thresholds, i.e., YES, then the image data is classified at 304 as Category 1a. If one or both are not less than or equal to the thresholds, i.e., NO, then the true color count NPg_TCCnt is compared to first and third thresholds T1 and T3 at 306. Additionally, the NPg_TCCnt and NPg_FCCnt are added together. If the NPg_TCCnt is greater than T1 but less than or equal to T3, and if the sum of the NPg_TCCnt and NPg_FCCnt is less than T4, i.e., YES, then the image data is classified at Category 1b at 308.

If, however, one or both are not true, i.e., NO, then at 310 it is determined if the NPg_TCCnt is in overflow. "Overflow" refers to an amount that meets or exceeds a maximum number or count that a register (hardware) can hold. For example, if register size is U16.0 and the NPg_TCCnt is about 65535, the NPg_TCCnt is an overflow. If YES to 310, then at 313 the sum to be used for any remaining decisions is SUM2 (e.g., as calculated using the equation noted above). If NO, then at 312 it is determined that SUM1 will be used for any remaining decisions (e.g., as calculated using the equation noted above).

At 314, it is determined if the selected SUM (i.e., SUM1 or SUM2) is greater than or equal to a fifth threshold T5. If it is not, i.e., NO, then the image data is then classified as Category 3 image data at 334.

If the SUM is greater than or equal to T5, then it is compared at 316 with a sixth threshold T6. If the SUM is further less than T6, i.e., YES, the image data is classified as Category 2a image data at 318. If, however, the SUM is not less than T6 (and greater than or equal to T5), i.e., NO, the sum is further compared to a seventh threshold T7. If the SUM is less than T7, i.e., YES, the image data is classified at 322 as Category 2b image data. If, however, the SUM is not less than T7, i.e., NO. then at 324 it is determined if the SUM is equal to or greater than T7. If YES, it is classified as Category 2c image data at 326.

Accordingly, the ranges in FIG. 3 illustrate an example of one implementation of thresholds being used to classify an image into one of a plurality of categories. Of course, it should be understood that other and/or additional ranges such as <60k, [60k, 70k], [70k, 80k], [80k, 90k], etc. may be implemented.

Determining Pixel Counts for Marking (e.g., at 116)

The pixel count for marking determination is made at 116 in method 100 in FIG. 1 during the processing in 108, for example. The detection or determination may be performed by a controller or processor (e.g., front end image processing elements 1004, as shown in FIG. 15) on a reduced image to save memory, for example. The determination of pixels for marking, however, is not limited to the below-described embodiment.

In this embodiment, the register count of pixels to be marked with a color (e.g., C, M, Y, or a combination thereof) may be based on processed image data in device dependent space. Each determination may be performed (using modules or processing elements such as those shown in FIG. 15) as follows:

Image data is provided in device dependent color space (having been received or converted thereto) for processing, such as, for example, CMYK color space, or any other device related color space for outputting image data. Detection may be performed on pixel-by-pixel basis, for example. Then a number of pixels in each color category (C, M, Y), is counted (e.g., using counters similar to those shown in FIG. 2, but for output colors) for each image/document. For example, the counters can include a C only counter, an M only counter, and a Y only counter. The counters can count the pixels for marking when the pixel is indicated as ON. Alternatively, the counters can count the pixels for marking if the pixel is OFF. In an embodiment, the counters can be configured to count for each instances of color, e.g., if a pixel is composed of C and M, a count can be made for both C and M pixels. Any number of counting methods for marked pixels can be used. Not only can the count of marked pixels be used for determining costs of marking material (e.g., ink) for output, but it can also be used to adjust a selected billing tier at which to bill a document.

Using the Determinations for Adjusting Billing Tier Levels

Once all pixels of color have been counted, the results of each of the color counters of the marking engine, i.e., the determined total counts of C, M, and Y pixels for marking in the received image, can be combined or used with the determined total counts of color pixels for each determined pixel classification (e.g., at 110) for determining a count of pixels for billing. That is, calculations and counts of color pixels are determined using the classification method of choice. This updated count of pixels for billing can then be used to determine if and what adjustments are to be made to the selected billing tier level.

In an embodiment, the count of pixels for billing (and thus billing tier adjustment) may be determined/adjusted by adjusting the counts from the CMY counter using an image derived offset from the neutral page fuzzy color counter. In another embodiment, the count of pixels for billing is a function of the neutral page fuzzy color counter. In another embodiment, new color counts may be calculated from a combination of neutral page true color and fuzzy color counters, and neutral pixel true color, fuzzy color, and fuzzy neutral counters. The counters are adjusted and normalized according to a page size for output.

In this disclosure, FIGS. 10-13 illustrates a proposed algorithm that is configured to compare various color percentages (e.g., derived or obtained from the determined counts of pixel classifications and counts for each pixel classification and the determined counts of the pixels for marking) to evaluate the tier level for each image, and adjust the tier levels, as needed. For example, in accordance with an embodiment (e.g., based on the examples described above), various color percentages are obtained from a combination of CMY, Neutral Page True Color, Neutral Page Fuzzy Color, and Neutral Pixel True Color counters, and compared to one or more predetermined thresholds. Any adjusting of billing tiers is based on results of the comparisons.

In accordance with an embodiment, the calculations that are used for determining if there should be adjusting of the billing tier levels, as illustrated in method 500 of FIGS. 10-13 and FIG. 14 (described further below), include those noted above, e.g., NPg_TCCnt, NPg_FCCnt, SUM3, SUM4, etc., as well as those defined as follows:

$$CMYPcntg = CMYCnt/(page\ size) \times (final\ resolution\ for\ marking)) \times 100$$

wherein

CMYPcntg is a percentage from CMYCnt without any offset;

CMYCnt is the CMY register count at the marking engine for colors C, M, and Y;

$$NPg\_TCPcnt = (NPg\_TCCnt \times 32/(page\ size \times original\ image\ resolution)) \times 100$$

wherein

NPg_TCPcnt is a percentage color from NPg_TCCnt $$NPg\_FCPcnt = (CMYCnt - (PF \times (Npg\_FCCnt \times 32 \times ((final\ resolution\ for\ marking)/(original\ image\ resolution)))))/((page\ size \times final\ resolution\ for\ marking) \times 100)$$

wherein

NPg_FCPcnt is a percentage from CMYCnt−PF×NPg_FCCnt;

PF=Percentage Factor $$NPx\_TCPnt = (NPx\_TCCnt/(page\ size \times original\ image\ resolution)) \times 100$$

wherein

NPx_TCPnt is a percentage from NPx_TCCnt;

NPx_TCCnt=Neutral Pixel True color count

BillTierLev=tier level for billing; can be an adjusted (new) tier level, resulting from execution of the herein described method Also, CMYOFFPcntg is a percentage=CMYCnt-Offset, Offset typically being a fixed, predetermined number that relates to a fixed count of pixels being subtracted from the CMYCnt in order to compensate for composite pixels. OrigTH1 and OrigTH2 are first and second original thresholds (respectively) in the existing and/or original billing scheme (e.g., in use in the system) for separation of tier levels, and NewTH1 and NewTH2 are new first and second thresholds (respectively) used for adjustment of tier levels.

In an embodiment, such as described herein, all of the same percentages/thresholds can be used for all tier levels. However, it should be understood that they can be different.

For example, in an embodiment, the neutral page module may work on a 600×600 image wherein the image going into the neutral page module is scaled by a factor (e.g., ⅛, ¼). The final image from the marking engine (IME) is 450×567 and the final percentage is calculated according to 8.5×11 page size. Thus, the above mentioned formulae may be substituted with said parameters for their calculations, e.g., CMYPcntg=CMYCnt/(8.5×11×450×567)×100, and so on.

In some instances, the value for percentage factor PF may be 0.75. This value, however, is optional and can be adjusted or need not be used.

Figure 5:
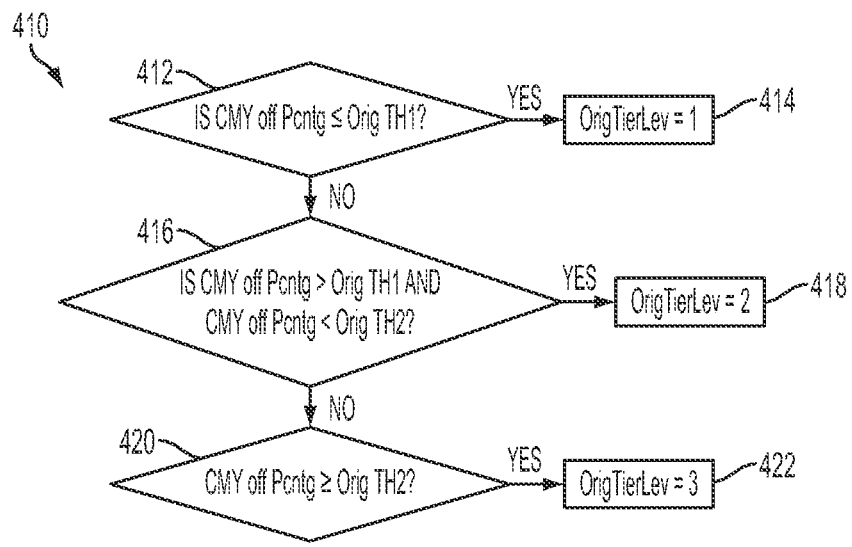
FIGS. 5-9 illustrate flow charts illustrating an algorithm or method using calculations for determining adjustment of a selected billing tier for image data in accordance with embodiments.

FIGS. 5-9 illustrate flow charts illustrating an algorithm or method for using calculations to determine factors (e.g., OrigTierLev, NP_TCTierLev) that may be used in determining if adjustment of a selected billing tier for image data should be performed in accordance with embodiments. The methods in FIGS. 5-9 assume that the original billing structure includes three (3) tier levels, tier 1, tier 2, and tier 3 (e.g., such as described with the thresholds above). This is used as an example here and throughout the disclosure, but is not meant to be limiting. More specifically, FIG. 5 shows a method for calculating an original billing tier level, OrigTierLev, at which to bill a received image data of a document. Using CMYOffPcntg, the method 410 determines at 412 if CMYOffPcntg is less than or equal to an original first threshold, OrigTH1. If yes, then at 414 the selected original billing tier level is tier 1. If no, it is then determined at 416 if CMYOffPcntg is greater than the original first threshold OrigTH1 and less than an original second threshold, OrigTH2. If yes, then at 418 the selected original billing tier level is tier 2. If no, it is verified at 420 that CMYOffPcntg is greater than or equal to original second threshold OrigTH2, and the selected billing tier is tier 3, as shown at 422.

Figure 6:
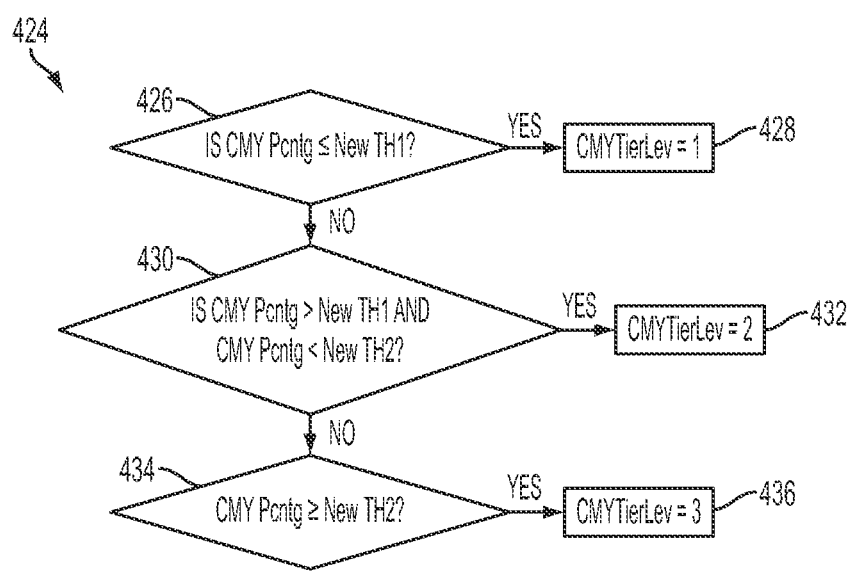

FIG. 6 shows a method for calculating CMY tier level, CMYTierLev, of the color pixels in the image data of a document. Again using CMYPcntg, the method 424 determines at 426 if CMYPcntg is less than or equal to an new first threshold, NewTH1. If yes, then at 428 the selected CMY tier level is tier 1. If no, it is then determined at 430 if CMYPcntg is greater than the new first threshold NewTH1 and less than a new second threshold, NewTH2. If yes, then at 432 the selected CMY tier level is tier 2. If no, it is verified at 434 that CMYPcntg is greater than or equal to new second threshold NewTH2, and the selected CMY tier level is tier 3, as shown at 436.

Figure 7:
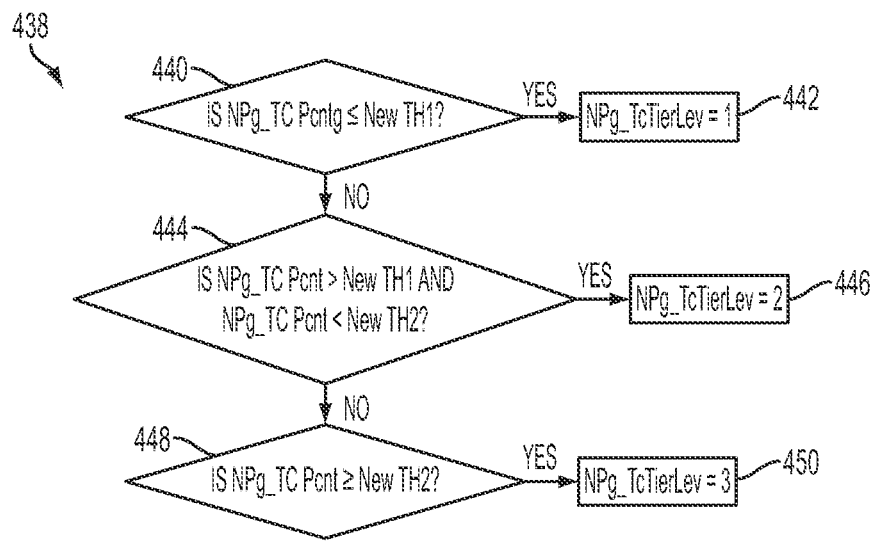

FIG. 7 shows a method for calculating a neutral page true color tier level, NPg_TCTierLev, of the true color pixels on a page in the image data of a document. Using NPg_TCPcntg, the method 438 determines at 440 if NPg_TCPcntg is less than or equal to new first threshold NewTH1. If yes, then at 442 the selected neutral page true color tier level NPg_TCTierLev is tier 1. If no, it is then determined at 444 if NPg_TCPcntg is greater than the new first threshold NewTH1 and less than new second threshold NewTH2. If yes, then at 446 the neutral page true color tier level is tier 2. If no, it is verified at 448 that NPg_TCPcntg is greater than or equal to new second threshold NewTH2, and the selected neutral page true color tier level is tier 3, as shown at 450.

Figure 8:
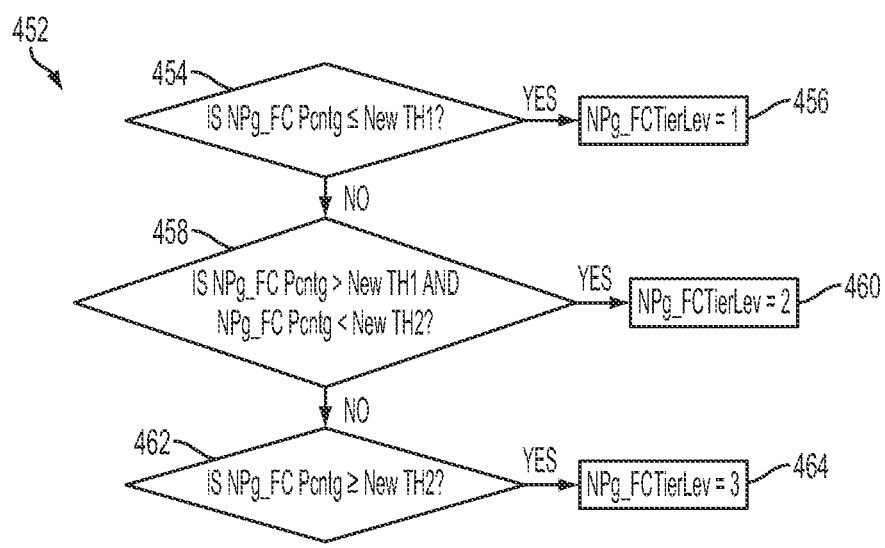

FIG. 8 shows a method for calculating a fuzzy page true color tier level, NPg_FCTierLev, of the fuzzy color pixels on a page in the image data of a document. Using NPg_FCPcntg, the method 452 determines at 454 if NPg_FCPcntg is less than or equal to new first threshold NewTH1. If yes, then at 456 the selected neutral page fuzzy color tier level NPg_FCTierLev is tier 1. If no, it is then determined at 458 if NPg_FCPcntg is greater than the new first threshold NewTH1 and less than new second threshold NewTH2. If yes, then at 460 the neutral page fuzzy color tier level is tier 2. If no, it is verified at 462 that NPg_FCPcntg is greater than or equal to new second threshold NewTH2, and the selected neutral page fuzzy color tier level is tier 3, as shown at 464.

Figure 9:
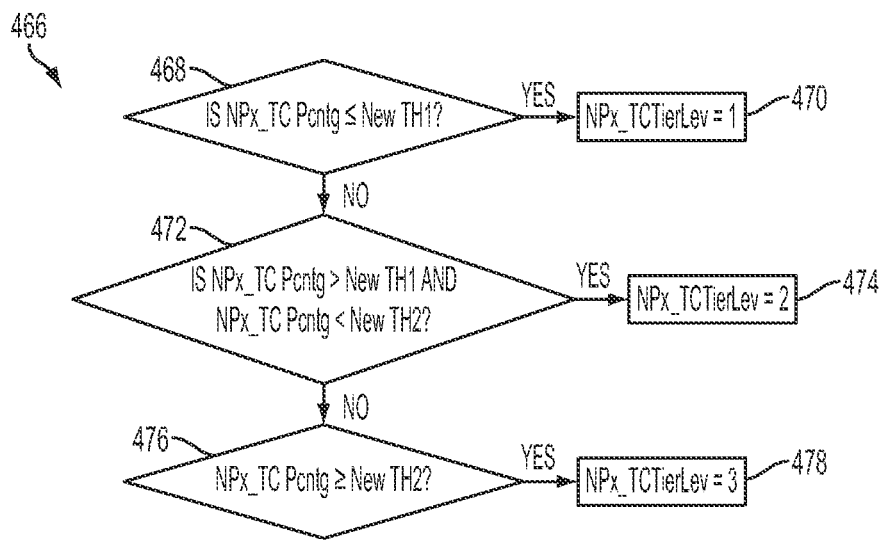

FIG. 9 shows a method for calculating a neutral pixel true color tier level, NPx_TCTierLev, of the true color pixels in the image data of a document. Using NPx_TCPcntg, the method 466 determines at 468 if NPx_TCPcntg is less than or equal to new first threshold NewTH1. If yes, then at 470 the selected neutral pixel true color tier level NPx_TCTierLev is tier 1. If no, it is then determined at 472 if NPx_TCPcntg is greater than the new first threshold NewTH1 and less than new second threshold NewTH2. If yes, then at 474 the neutral pixel true color tier level is tier 2. If no, it is verified at 476 that NPx_TCPcntg is greater than or equal to new second threshold NewTH2, and the selected neutral pixel true color tier level is tier 3, as shown at 478.

SUM 3 may or may not be the same as SUM1 and SUM2. However, SUM 3 can be calculated in the same manner, e.g., SUM3=NPg_TCCnt+MF*NPg_FCCnt (MF being a multiplication factor).

After the count of pixels for marking (CMYCnt) and percentage without any offset (CMYPcntg) are calculated, they can be compared to a number of thresholds along with the neutral page true color count (NPg_TCCnt), neutral page fuzzy color count (NPg_FCCnt) and sums (as previously described) to determine if billing tier level adjustment should be made. The thresholds such as T8-T9 and percentage thresholds PT1-PT3, for example. Such thresholds may be programmable parameters that are based on the current/original billing tiers, for example, or the desired levels of image classification. In some embodiments, these programmable parameters could be based on the variables CMY_TH1 and CMY_TH2 described above for CMYK color space. This may, for example, provide a more accurate mapping between classified images and final tier placement of the CMYK images, since the final output may be an unscaled image. Weighting factors as explained above can help in the correlation expression if the neutral page or neutral pixel algorithm is applied on a scaled image with scaled counters coming out of those modules, for example.

In accordance with an embodiment, some of the thresholds used in FIGS. 10-13 are the same as those for FIG. 3 (e.g., T1-T7). The additional thresholds used in FIGS. 10-13 may be defined, in an embodiment, as follows:

| Threshold | Value (Number of pixels; k = one thousand) |
|---|---|
| T8 | 40k |
| T9 | 14k |

| Percentage Threshold | Value (percentage of color/CMY pixels in image for marking, %) |
|---|---|
| PT1 | 7.5 |
| PT2 | 7 |
| PT3 | 6.0 |

However, these threshold values and the numerical count of thresholds used for comparison and classification are exemplary, and thus should not be limiting. More or less categories and/or subcategories may be defined which in turn adjust the number of billing tiers and structures that are associated with a system. In some cases, the amount of categories and/or billing tiers may be adjusted based on the number of tiers or structures that are associated with a system, based on a customer's profile, and/or based on the output parameters of the system.

Figure 10:
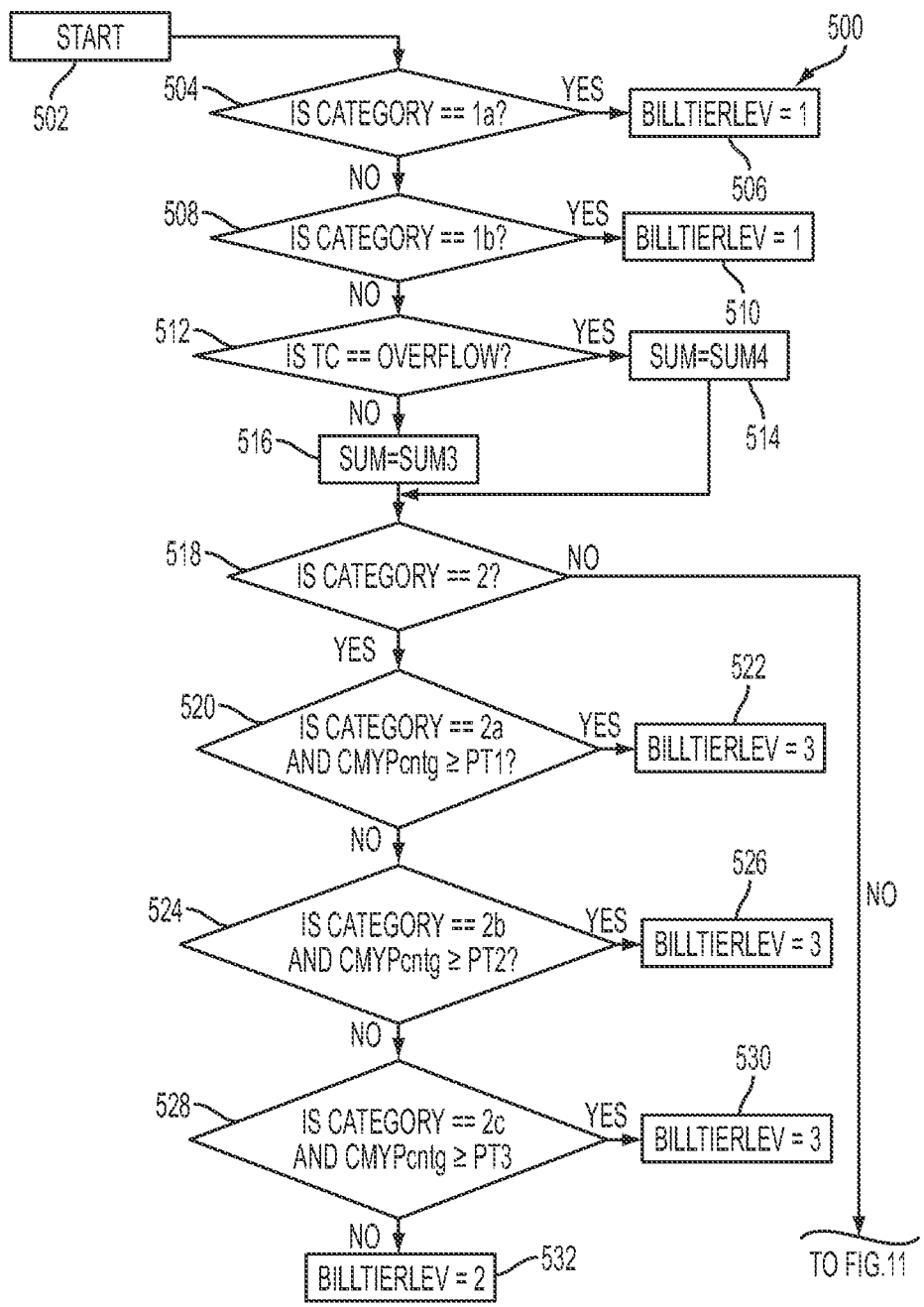
FIGS. 10-13 illustrate parts of a flow chart/block diagram of illustrating an algorithm or method for using data related to the image classification, determined counts of classified pixels and/or the determined counts of pixels for marking and original tier levels to adjust a selected billing tier.

Referring specifically now to the steps for determining if adjustment from a selected billing tier is implemented, method 500 uses the above calculations (e.g., based on the steps and information determined during classification and counting). The method 500 of FIGS. 10-13 may be implemented for each page of image data, or for an entire document. Again, in this example, at least three billing tier levels are used, e.g., Tiers 1, 2, and 3. Also, the categories referenced as being used for classification of the image data in FIG. 10 are Category 1a, Category 1b, Category 2a, Category 2b, Category 2c, and Category 3.

Method 500 starts at 502 and determines if the image data was classified into Category 1a at 504. If YES, then the image data is billed at 506 as a first billing tier image, e.g., BILLTIERLEV=Tier 1. If the image data is not Category 1a at 504, i.e., NO, then at 508 it is determined if the image data is classified as Category 1b. If YES, then the image data is billed at 510 as a first billing tier image, e.g., BILLTIERLEV=Tier 1.

If not true, i.e., NO, then at 512 it is determined if the TCCnt is in overflow. "Overflow" refers to an amount that meets or exceeds a maximum number or count that a register (hardware) can hold. For example, if register size is U16.0 and the TCCnt is about 65535, the TCCnt is an overflow. If YES to 512, then at 516 the sum to be used for any remaining decisions is SUM3 (e.g., as calculated using the equation noted above).

At 518, it is determined if the image data is classified as a Category 2 image. If it is not, i.e., NO, then the billing tier level is further analyzed and processed, as shown in FIG. 11, described below.

If the image data is classified as a Category 2 image, i.e., YES, then it is determined at 520 if the image data is classified as Category 2a and if CMYPcntg is greater than or equal to a Percentage Threshold PT1. Each percentage threshold PT1, PT2, and PT3 as defined herein is a threshold that is selected for determining color pixel/CMY levels in each of the tier levels for billing, and is not meant to be limiting. If it is Category 2a image data and if the percentage CMYPcntg is also greater than or equal to a first percentage threshold of color pixels in an image for marking, PT1, i.e., both are YES, then the image data is billed at 522 as a third billing tier image, e.g., BILLTIERLEV=Tier 3. That is, the selected billing tier level is adjusted to a third tier image (e.g., rather than a second tier image) for billing. If, however, either one of the Category or CMYPcntg comparisons is not true (e.g., CMYPcntg is not greater than or equal to PT1), i.e., NO, the image data is compared at 524. It is determined at 524 if the image data is classified as Category 2b, and the CMYPcntg is further compared to a second percentage threshold of color pixels in an image for marking, PT2. If the image data is classified as Category 2b and if the CMYPcntg is greater than or equal to PT2, i.e., YES, then the image data is billed at 526 as a third billing tier image, e.g., BILLTIERLEV=Tier 3. That is, the selected billing tier level is adjusted to a third tier image (e.g., rather than a second tier image) for billing. If, however, the classification is not Category 2b and/or the CMYPcntg is not greater than or equal to PT2, i.e., NO. then at 528 it is determined if the image data is classified into Category 2c image data and if the CMYPcntg is greater than or equal to a third percentage threshold of color pixels in an image for marking, PT3. If YES, it is billed as a third billing tier image, e.g., Tier 3, at 530. If NO at 528, then the image is billed as a second billing tier image, e.g., Tier 2, at 532.

Figure 11:
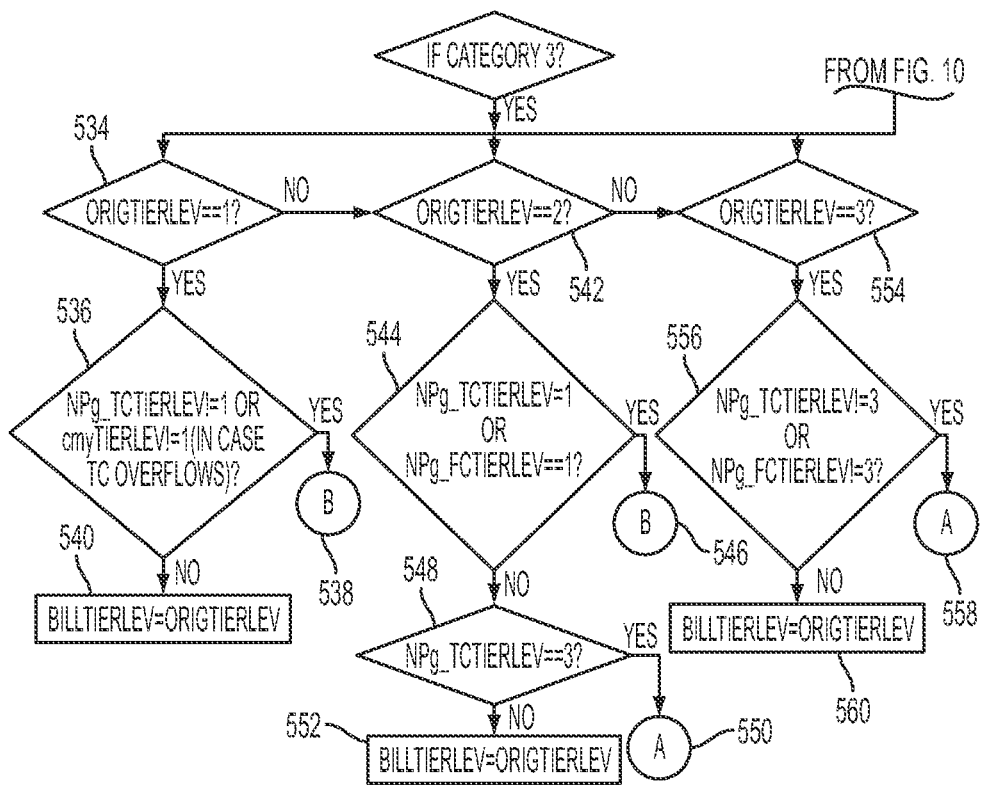
Figure 13:
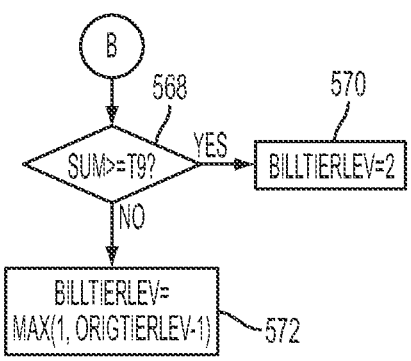

Referring back to 518, if it is determined that the image data is not classified as a Category 2 image, the billing tier level is further analyzed and processed, as shown in FIG. 11. For example, at 534 it is determined if the original tier level from the current/original billing method is Tier 1. If YES, then it is analyzed at 536 to determine if the Tier level that NPg_TCPcntg falls in (based on NewTH1 and NewTH2, used in FIG. 7) is equal to 1 (i.e., TCTIERLEV!=1) OR if the Tier level that CMYPcntg falls in (based on NewTH1 and NewTH2, used in FIG. 6) is equal to 1 (i.e., cmyTIER-LEV!=1). If either is YES, then the data is further analyzed at 568 as shown in FIG. 13. At 568 it is determined if the SUM (i.e., SUM3) is greater than or equal to a ninth threshold T9. If YES, then the image data is billed at 570 as a second billing tier image, e.g., BILLTIERLEV=Tier 2. If NO, then the new tier level for billing for the image data is determined at 572 to be Tier 1 (equal to a maximum of tier level 1 and original tier level 1). Otherwise, if the answer is NO at 536, then at 540 the tier level remains the same for billing, i.e., the tier level for billing for the image data remains equal to the original/current tier level (Tier 1), and no adjustments are made.

Figure 12:
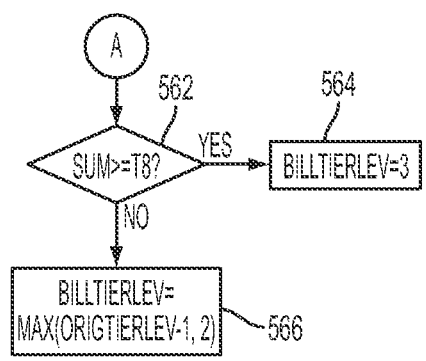

If, at 534, the original tier level is not Tier 1, i.e., NO, then it is analyzed at 542 to determine if the original tier level is Tier 2. If YES, then at 544 it is analyzed to determine if the Tier level that NPg_TCPcntg falls in (based on NewTH1 and NewTH2, shown in FIG. 7) is equal to 1 (i.e., TCTIER-LEV=1) OR if the Tier level that FCPcntg falls in (based on NewTH1 and NewTH2, used in FIG. 8) is substantially equal to 1 (i.e., FCTIERLEV==1?). If either is YES, then the data is further analyzed at 568 as shown in FIG. 13. At 568 it is determined if the SUM (i.e., SUM3) is greater than or equal to a ninth threshold T9. If YES, then the image data is billed at 570 as a second billing tier image, e.g., BILLTIERLEV=Tier 2. If NO, then the new tier level for billing for the image data is determined at 572 to be Tier 1 (equal to a maximum of tier level 1 and original tier level 1). Otherwise, if the answer is NO at 544, then at 548 it is determined if the Tier level that Npg_TCPcntg falls in (based on NewTH1 and NewTH2, shown in FIG. 7) is equal to 3 (i.e., TCTIERLEV==3?). If NO, then at 552 the tier level remains the same for billing, i.e., the tier level for billing remains the original/current tier level (Tier 2), and no adjustments are made. If YES, then the data is further analyzed as shown in FIG. 12. Specifically, at 562 it is determined if the SUM is greater than or equal to an eighth threshold T8. If YES, then the image data is billed at 564 as a third billing tier image, e.g., BILLTIERLEV=Tier 3. The billing tier is adjusted from a determined/selected billing tier of Tier 2 to Tier 3. If NO, then the tier level for billing for the image data is determined at 566 to be a maximum of original tier level −1 and level 2).

If, at 542, the original tier level is not Tier 2, i.e., NO, then it is analyzed at 554 (by default) to determine/acknowledge that the original tier level is Tier 3. Then at 556 it is analyzed to determine if the Tier level that Npg_TCPcntg falls in (based on NewTH1 and NewTH2) is equal to 3 (i.e., TCTIER-LEV!=3) OR if the Tier level that NPg_FCPcntg falls in (based on NewTH1 and NewTH2) is substantially equal to 1 (i.e., FCTIERLEV!=3?). If either is YES, then the data is further analyzed at 558 as shown in FIG. 12. Specifically, at 562 it is determined if the SUM is greater than or equal to an eighth threshold T8. If YES, then the image data is billed at 564 as a third billing tier image, e.g., BILLTIERLEV=Tier 3. The billing tier is adjusted from a determined/selected billing tier of Tier 2 to Tier 3. If NO, then the tier level for billing for the image data is determined at 566 to be equal to a maximum of original tier level −1 and level 2). Otherwise, if the answer is NO at 556, then at 560 it is determined that the tier level remains the same for billing, i.e., the tier level is equal to the original/current tier level, and no adjustments are made to the tier (Tier 3).

Accordingly, the ranges, thresholds, tiers, etc. in the FIGS. 10-13 described above illustrate an example of one implementation of thresholds being used to classify an image into one of a plurality of categories and billing tiers. Of course, it should be understood that other and/or additional ranges such as <60k, [60k, 70k], [70k, 80k], [80k, 90k], 5%, 8%, etc. may be implemented.

To generate the method 500, test images were analyzed and reviewed. In an example, about 290 images were tested to determine thresholds and percentages for analysis in method 200. These 290 test images were copied/printed using a solid ink multifunction machine implementing a known prior billing tier method and using a solid ink multifunction machine implementing the herein disclosed adjustable billing tier method (500). Of those images, 148 were copied in default mode on the solid ink multifunction machine, 61 were xerographic prints copied in default mode on the solid ink multifunction machine, and 81 were xerographic images copied in photocopied original mode on the solid ink multifunction machine. As a result, it was determined that of the total of 290 images, 80 produced wrong results using the prior billing tier method, while only 32 produced wrong results using the algorithm of FIGS. 10-13. The percentage error using the prior billing tier method is approximately 27 percent, while the percentage error with the herein disclosed method 500 is only approximately 11 percent.

In another test, 92 images were printed on a solid ink multifunction machine, one implementing a prior billing tier method and one implementing the algorithm as proposed herein (FIGS. 10-13). The images included a variety of categories, including a range of images from very colorful to not very colorful images. The following chart illustrates a summary of the results:

| Targets | Resulting Billing Tier using Prior Billing Method | Resulting Billing Tier using Proposed Solution |
|---|---|---|
| 1. Not very colorful Doc1 Solid Ink | 1* | 2 |
| 2. Not very colorful Doc1 1.3 Xerographic | 1* | 2 |
| 3. Not very colorful Doc2 1.4 solid Ink | 1* | 2 |
| 4. Not very colorful Doc2 1.4 Xerographic | 1* | 2 |
| 5. Very colorful Doc3 8.5% Solid Ink | 2* | 3 |
| 6. Very colorful Doc3 8.5 Xerographic | 2* | 3 |
| 7. Solid ink composite no color doc4 | 3* | 1 |
| 8. Colorful doc5 SI | 2* | 3 |
| 9. Not very colorful doc6 SI | 2* | 1 |
| 10. Colorful doc7 SI | 3 | 2* |
| 11. Colorful doc8 SI | 3* | 2 |
| 12. Colorful doc9 SI | 3 | 2* |
| 13. Colorful doc10 SI | 2* | 3 |
| 14. SI Tier Level1 Images Set of 5 | 3 Images at level 2* | all fixed |
| Customer hybrid images SI | | All are correct |
| Pg. 2 | 2* | 1 |
| Pg 3 | 2* | 1 |
| Pg 4 | 3* | 2 |
| Pg 5 | 2 | 2 |
| Pg 6 | 2 | 2 |
| Pg 7 | 3 | 3 |
| Pg 8 | 3 | 3 |
| Colorful doc11 SI | 3 | 2* |
| Not very colorful doc12 SI | 2* | 1 |
| % Error | 18/92~19.5% | 4/92~4.3% |

*Incorrect determined billing tier

As shown, the percentage of error of selecting the correct billing tier to bill the customer for output is greatly reduced from 19.5 percent using a prior method as compared to 4.3 percent using method 500.

Of course, it should be understood that the above results are exemplary and not meant to be limiting.

Accordingly, the billing tiers can be adjusted using the determined counts in the determined pixel calculations and the determined counts of pixels for marking. For example, in accordance with an embodiment, assuming that an original threshold percentage for distinguishing between Tier 1 and Tier 2 images is images having less than 1.2 percent color pixels in the image, and between Tier 2 and Tier 3 images is 7.5 percent. In accordance with the herein disclosed method, these percentages can be updated, e.g., the new threshold percentage for distinguishing between Tier 1 and Tier 2 images may be adjusted to 1.33 percent, and the percentage for distinguishing between Tier 2 and Tier 3 images may be 8 percent.

Besides the billing tier levels being adjustable, the billing categories (or classes) for which images are classified can also be adjusted. For example, referring to FIG. 4, the graphical representation of the billing categories can be updated based on the described threshold comparisons (e.g., adjusted or subcategorized).

As an example, the following calculations may be used in the herein disclosed method 500 to adjust the tier levels of images:

Category 1 images:
Billed at Tier Level 1. Values for thresholds in FIG. 4 may be: [TH1=1k] and [TH2=4k, TH3=10k].

Category 2 images:
Tier Level is decided based on whether Final Percentage (FinalPcnt, defined below) is greater than or less than the tier thresholds, e.g., Tier1_TH and Tier2_TH.

For category 2 images:
FinalPcnt=min(NPx_TCPcnt, CMYPcnt)
Values for TH4 and TH5 in FIG. 4 may be between 40k and 65k (over flow case)
Final tier level is defined as:
If FinalPcnt<=Tier1_TH→Tierlevel=1,
Else if Tier1_TH<=FinalPcnt<=Tier2_TH→Tierlevel=2,
Else if FinalPcnt>Tier2_TH→Tierlevel=3.

Category 3 images:
For Category 3a:
Assuming images are not classified as Category 1 or 2 images, and a Category 3 threshold, e.g., TH_Category3 with a value that is 0.5→1, then, calculate delta1 and delta2:

delta1=abs(NPg_TCPcnt−NPg_FCPcnt)

delta2=abs(NPg_TCPcnt−NPx_TCPcnt)

wherein
abs=absolute value
If delta1<=TH_Category3 and delta2<=TH_Category3a, take FinalPcnt=min(NPg_TCPcnt, NPg_FCPcnt, NPx_TCPcnt)
Else, if the image falls into Category 3b.
Category 3b:
If delta1 or delta2>=TH_Category3, take
FinalPcnt=ave(NPg_TCPcnt, NPg_FCPcnt, NPx_TCPcnt)
Else, the image falls into Category 3c.
Category 3c:
Compare FinalPcnt calculation from Category 3a to Tier1_TH and Tier2_TH. If FinalPcnt is within 0.01 of the thresholds Tier1_TH and Tier2_TH i.e. [1.32, 1.34] or [7.51, 7.49]. If typical values for Tier1_TH and Tier2_TH are 1.33 and 7.5, respectively take
FinalPcnt=ave (NPg_TCPcnt, NPg_FCPcnt, NPx_TCPcnt)

Figure 14:
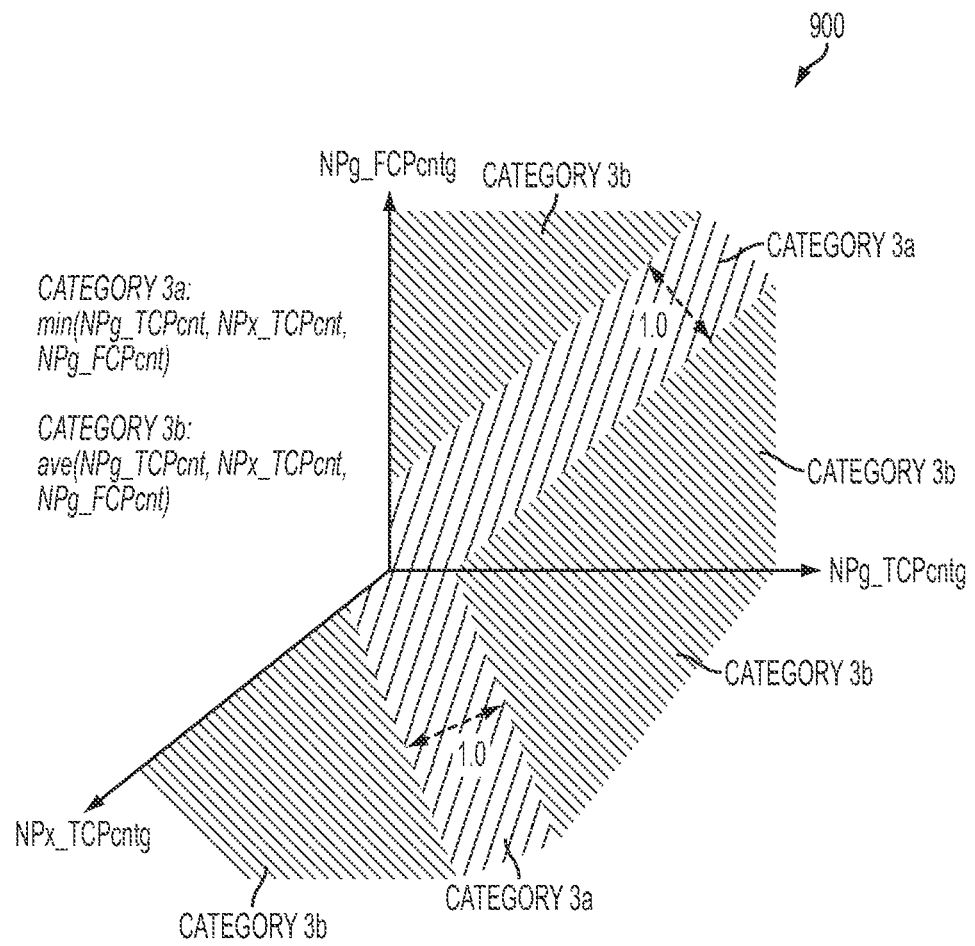
FIG. 14 illustrates another graphical representation of adjusting a selected billing tier level based on a combination of image classification, determined counts for classified pixels and determined counts of pixels for marking in accordance with another embodiment of the present disclosure.

FIG. 14 illustrates a graphical representation of adjusting a selected billing tier level with two sub categories or tier level evaluations defined within category 3, based on a combination of image classification, determined counts for classified pixels and determined counts of pixels for marking. This in turn can correlate to tier levels for billing based on pixel classification and counting and marking pixel counts, based on comparison of these counts with thresholds (as shown in FIGS. 10-13). Again, the classifications can be extended and/or altered to adjust the categories for classification and/or billing tier levels to N-categories and/or N-tiers, and therefore the illustration is not meant to be limited. Specifically, graph 900 shows a representation of possible subcategories of Category 3 images using neutral page fuzzy color percentage NPg_FCPntg, neutral page true color percentage NPg_TCPcntg and neutral pixel true color percentage NPx_TCPcntg as determined for a document. For example, Category 3 images may be split into only two subcategories, Category 3a and Category 3b, which may be defined as follows:

Category 3a=min (NPg_TCPcnt, NPx_TCPcnt, NPg_FCPnt)
Category 3b=ave (NPg_TCPcnt, NPx_TCPcnt, NPg_FCPnt)
where min is defined as a minimum, and where ave is defined as an average.

1.0 is shown as a TH_Category3 threshold value; however, other values, such as 0.5, could also be used. The value 1.0 is an example of a threshold to determine how close the subcategories Category 3a and 3b can be. Although the graph is FIG. 14 is three-dimensional, i.e., using three features for determining the billing tier and adjustment (if needed), similar calculations can be made for two dimensional calculations (using only two features).

Thus, in an embodiment, when the classification is determined in step 110 of method 100 shown in FIG. 1, and the image data is categorized, these categories (e.g., Category 1-Category 3) may correspond or correlate to different billing tiers (e.g., Tiers 1-3). That is, if the image data of the document is classified into category 1, the billing structure is initially defined as being an original billing tier level that is based on a first tier (e.g., black content/neutral, level 1 impressions); if the image data is classified into category 2, the billing structure is initially defined as being an original billing tier level that is based on a second tier (and/or third tier) is used to determine the billing structure (e.g., everyday color, level 2 impressions, and/or expressive color, level 3 impressions), etc. In an embodiment, each of the categories and the subcategories, i.e., categories 1a, 1b, 2a, 2b, and 2c, that are determined based on the processing at 110 may correlate to an original billing tier. Then, after the count of pixels for marking is determined as shown at step 116 of method 100, the categories/billing tiers originally determined at 110 can be adjusted at 120 by including the results at 116 and image classification. In an embodiment, the adjustment at 120 is based on combination of information from the counters. In another embodiment, the adjustment is based on an offset. In another embodiment, no adjustment to the determined billing tier level is made.

A different billing rate may be assigned to or associated with each of the billing tiers. The rates can change based on the number of billing tiers. The rates may also be based on a customer profile. These may be expressed, for instance, in cost ($) per page (or document). However, such values are not to be construed as limiting, and it will be appreciated that different users may adopt different billing schemes.

Although not shown, it should be understood that additional image feature counters from the independent color space neutral page or neutral pixel methods, such as, for example, very colorful counter, color counter, highlight counters, fuzzy neutral counters, saturated color and non-saturated color counters can be used. Moreover, the classification of images could use a combination of device independent color space (e.g., Lab/YCbCr) counters and the device dependent color space (e.g., CMYK) counters, such as, for example, to improve accuracy.

In an embodiment, additional image classification may be based upon neutral page algorithms. This classification prepares the images for better billing strategies by providing the flexibility to apply different offsets/compensation factors ((which could be image dependent or independent) and algorithms for the various image classes.

The above-described embodiments are exemplary and illustrate examples of using counters in device independent space and device dependent space to calculate a more accurate billing tier for images so that pixels that are rendered neutral (and not visibly color to the human eye when output) are not counted as color when determining a billing structure. In copy path images, for example, many pixels in a composite gray area may be typically labeled as color and skew billing detection results. However, the above-described methods improve the color detection for billing. From a customer point of view, the methods disclosed herein not only avoid the mistake of billing a neutral page or gray pixels as color, but also determine an accurate billing structure based on visibly output color.

Different billing processes and/or parameters may be selected and applied based on the image type. This may include a step-wise approach that uses an independent color space page detection scheme to evaluate or select a correct color-tier level for a billing system for color images. The independent color space page detection scheme is configured to properly identify and handle composite black and neutral colors. This process reduces the errors introduced by the conventional billing method discussed above.

The herein described method may be used by any MFD (or printer or copier) manufacturing companies that wish to implement image paths capable of rendering pixels neutral with composite black without counting these pixels as color in billing. As noted below, the method may be implemented by hardware and/or software in existing systems or added to systems for implementation.

FIG. 15 illustrates a block diagram of an example of an image path 1000 for processing image data of a system, device or image processing apparatus 1003, for classifying and billing for documents using the method of FIG. 1 according to an embodiment. The apparatus 1003 comprises, among other devices, an input device (e.g., IIT or memory) 1002, a processor or processing elements represented by 1004 and 1010, a memory 1006 and/or a storage device 1008, and an output device (e.g., image output terminal (IOT)) 1014 with a marking engine interface 1012. The image path 1000 of the system 1003 may also include an examination element 1018 and/or cost calculation element 1020 which may be a part of the system 1003 itself or in communication with the processing elements 1004 and 1010, for example. Generally, the above elements (as will be described) of the device are provided to perform functions that assist in receiving image data such as a scanned document, configuring the image path of the processing elements 1004 and 1010 (and possibly elements 1018 and 1020) to process the image data, and, if needed, outputting the image data such as by printing a document according to an output mode that may be selected. However, it should be noted that the apparatus or device may comprise additional elements not described herein or alternative elements for performing similar functions, and should not be limited to those elements as illustrated in FIG. 15. Generally, the image path shown in FIG. 15 corresponds to any number of output modes that may be selected for an image processing apparatus, system, or device.

The input device 1002 is used to deliver image data of a document to the system 1003 and/or processing elements in the image path. In some embodiments, the input device 1002 is used to scan or acquire an input document 1001 or page into image data, such as when copying a document, for example. The input device 1002 may be a digital scanner, for example. Generally, however, any device used to scan or capture the image data of a document for an image processing apparatus may be used. For example, the image data may be captured by a scanner in a copier, a facsimile machine, a multi-function device, a camera, a video camera, or any other known or later device that is capable of scanning a document and capturing and/or inputting electronic image data. The input device 1002 may include submission of electronic data by any means and should not be limiting. In other embodiments, the input device 1002 may be an electronic device for inputting electronic image data. In some embodiments, input device 1002 may be connected to a communication network 1022 or telephone system, for example, to receive as input image data such as via a facsimile (fax) machine or computer (CPU). Input documents and/or image data that is received electronically may be received via a telephone number, an e-mail address, an Internet Protocol (IP) address, a server, or other methods for sending and/or receiving electronic image data. The network may be a digital network such as a local area network (LAN), a wide area network (WAN), the Internet or Internet Protocol (IP) network, broadband networks (e.g., PSTN with broadband technology), DSL, Voice Over IP, WiFi network, or other networks or systems, or a combination of networks and/or systems, for example, and should not be limited to those mentioned above.

If needed, the input or received image data may be converted using the input device 1002 and/or processing elements in the apparatus 1003. For example, in embodiments, the image data may be converted from device dependent space to device independent space (e.g., RGB to CIE L*a*b). Alternatively, the image data may be received in device independent space (e.g., CIE L*a*b). The type of image data received and the type of input devices documents are received therefrom should not be limiting.

In any case, image data, such as image data for an original document 1001, may be received or input in either device dependent or device independent space from the input device 1002, depending on the capability of the input device or the architecture of the system. The input device 1002 may capture image data as binary or contone image data, for example. Generally, when the input image data from the input device is received in device dependent space, the processing elements in the image path will typically convert such image data to some device independent space for further processing before converting the image data to device dependent space (e.g., to be output). The input and output devices deal with different device dependent color spaces, and most of the image processing in the image path 1000 is performed in a device independent space to produce output images of the highest possible quality.

FIG. 15 also shows a processor or processing elements for processing and/or manipulating image data using a plurality of operations and/or processes. The description of the processing elements below is an example of devices capable of implementing processes to be performed and should not be limiting. For example, additional processing elements may be provided along the image path 1000. Additionally and/or alternatively, additional operations may be performed on the image data other than or in addition to those described with reference to these figures.

The image path 1000 of system 1003 may comprise a plurality of image processing elements (or processor) for manipulating image data received from the input device 1002 using a plurality of operations and/or processes. The processing elements may be a combination of image processing elements which comprise software and hardware elements that perform a number of operations on the image data received from the input device 1002 (e.g., scanner, memory, or other source) using a set of parameters. The parameters are used to convert the images to the format desired as output (e.g., high quality) along the image path. The processing elements may be a part of a computer system, device, or apparatus such as a xerographic system, a photocopier, a printing device, or a multi-function device (MFD). For simplicity purposes, the term "processing element" throughout the application will refer to one or more elements capable of executing machine executable program instructions. It is to be understood that any number of processing elements may be used and that additional operations or processes besides those described below may be provided in an image path.

More specifically, the image path of FIG. 15 comprises a front end processing element(s) 1004, a memory 1006, storage 1008, and a back end processing element(s) 1010. Each of the devices or elements in the image path may be communication with each other, as represented by path 1007. The front end processing element(s) 1004 may comprise any number of processing elements/modules and is/are image processing elements that receive image data in a beginning of an image path and is/are used to process the image data according to user preferences such that it may be stored and later retrieved for output. The back end processing element(s) 1010 may comprise any number of processing elements/modules and is/are generally used at the end of an image path to retrieve stored image data and to process the image data such that the image data may be output to a printing device as an accurate recreation of the original input or scanned image. Of course, processing elements may also be used for compression and/or decompression of image data.

In an embodiment, one or more of the elements (e.g., processing elements 1004, 1010 and memory 1006/storage 1008) of system 1003 may be connected to a network 1022 or telephone system, for example, for communication with other devices, systems, or apparatuses. For example, in some cases, image data or executable instructions may be provided via a computer (CPU) connected to the network 1022. As further described below, in a possible embodiment, at least one processing element of system 1003 may implement an operative set of processor executable instructions of a billing system. Such a billing system or the executable instructions may be provided via the network 1022, for example.

Each of the image processing elements comprises an input and an output. Additionally, the system, device, or apparatus may also include one or more controllers or routers (not shown) to select and route the image data between the processing elements 1004 and 1010 and memory 1006 and/or storage 1008, and other elements described below, for example.

Front end processing element(s) 1004 receives (e.g., as input) the image data from the input device 1002 and processes the image data. The image data may be received as input via a scanning engine interface, for example, such as when copying and turning a hard copy document into image data. Alternatively, the image data may be received electronically, such as from a memory device, storage device (portable or remote), et al., such as when printing a saved document. As such, the form in which image data is received should not be limiting. Front end processing element(s) 1004 may be used to process the scanned image data as well as determine user-defined operations generally known in the art. For example, the front end processing element 1004 may be used for color space conversion, reduction or enlargement, document registration, and/or performing other operations or processes on the image data, for example. In some embodiments, the front end processing element 1004 converts the image data (e.g., from device dependent to device independent image data, when received via a scanner) for processing and determines neutral and non-neutral pixels. In the herein disclosed method, front end processing element 1004 may be used (alone or in cooperation with other elements) to determine an original billing structure, such as noted at 110 of the method 100 in FIG. 1 and for image classification.

Memory 1006 and/or storage 1008 may be used to store image data. For example, memory 1006 and/or storage 1008 may be used to temporarily store the original image data of document input via input device 1002. Converted (e.g., binary to contone image data) or compressed image data may also be stored in the memory 1006 and/or storage 1008. Memory 1006 and/or storage 1008 may be used to store machine readable instructions to be executed by the processor/processing elements. The memory 1006 and/or storage 1008 may be implemented using static or dynamic RAM (random access memory), a floppy disk and disk drive, a writable optical disk and disk drive, a hard disk and disk drive, flash memory, or the like, and may be distributed among separate memory components. The memory 1006 and/or storage 1008 can also include read only memory, or other removable storage drive(s) or memory devices.

The front end processing element(s) 1004 may communicate with memory 1006 and/or storage 1008 of system/apparatus 1000 to store processed and/or compressed image data, for example. Compressed image data may be stored in memory 1006 and/or storage 1008 temporarily or for a later time when needed. When the image data is needed or it is time for marking (e.g., using the marking engine interface 1012 of output device 1014), the image data may be retrieved from memory 1006 and/or storage 1008 via the back end processing element(s) 1010 to export the image data that has been scanned, for example.

Back end processing element(s) 1010 receives processed image data from the memory 1006 or storage 1008. Back end processing element (s) 1010 may be used to further render the image data for output. For example, back end processing element 1010 may be used to convert the color space of the processed image data (e.g., convert from device independent CIE L*a*b color space to device dependent CMYK color space), provide color balance, further rendering, filtering, and/or other operations or processes. Subsequently, back end processing element(s) 1010 may be used to decompress the image data and output the image data via the marking engine 1012 and output device 1014. The output of processed image data from the back end processing element 1010 depends on the image path (or output mode).

In an embodiment, the processed image data may be directly output to the marking engine interface 1012 for printing using an output device 1014. The marking engine interface 1012 may be associated with an output device 1014 such as a printer, a copier, or an MFD which is used for printing documents. In some cases, the marking engine interface may be a part of the output device 1014, as shown in FIG. 15. In some cases, the marking engine interface may be separate from the output device 1014. The marking engine interface 1012 is used to output the processing image data to the printer, for example. Specifically, the marking engine interface 1012 may be designed to receive the reconstructed and processed image data in device independent space in order to send or output the image data via the output device 1014 (e.g., printer) for a copy or print job. The marking engine interface 1012 may further perform image processing on the image data to make corrections or compensate for deviation in the printing process. In the herein disclosed method, marking engine interface 1012 is used (alone or in cooperation with other elements, e.g., back end processing element 1010) to determine i.e., a count of pixels for marking, such as noted at 116 of the method 100 in FIG. 1. Marking engine interface 1012 and/or back end processing element 1010 may also further be used to adjust billing structure, such as noted at 118 of the method 100 in FIG. 1. Alternatively, the back end processing element(s) 1010 may be used to perform further image processing on the image data. In one embodiment, the back end processing element(s) 1010 may be used for calculating the amount of CMY color coverage and/or to determine the toner/ink consumption of the output device 1014 (e.g., to inform a user that ink needs to be replaced, for example), i.e., a count of pixels for marking, such as noted at 116 of the method 100 in FIG. 1.

The marking engine interface 1012 outputs processed image data to the output device 1014 for outputting the image data of the document. The type of output device 1014 should not be limiting. For example, the output device 1014 may comprise an image output terminal (IOT), printing device, copying device, or MFD, and may include other devices (e.g., display, screen), as generally noted above. The display or screen may be a part of a computer (CPU) or user interface (UI) or may be provided to relay information from a website or other device via a network 1022, for example. In some cases, a UI may be provided directly on the apparatus/device, while in others a UI is provided as a separate electronic device.

It should be noted that the output print quality of image data from an output device 1014 such as a MFD may depend on the type of system or device (and its available output modes/resolution). In some cases, multiple print quality modes (PostScript driver), each with a different resolution, are supported. Of course, the algorithms and processes used by the elements in the image path shown in FIG. 15 should not be limiting. Any number of data compression algorithms (e.g., lossless, lossy), decompression algorithms, color conversion algorithms (e.g., contone to binary, or binary to grayscale) and the like may be performed on the image data (in addition to method 100) to provide a high quality output document 1016.

In an embodiment, the system or apparatus 1003 may further comprise one or more elements for determining a billing structure and/or a billing cost for outputting a page or document via an output device such as device 1014. For example, as shown in FIG. 15, an examination element 1018 and/or cost calculation element 1020 are provided in at least in communication with system 1003. In an embodiment, the examination element 1018 and/or cost calculation element 1020 may be a part of the image path 1000 of system 1003. In an embodiment, the elements 1018 and/or 1020 are separate from the image path of the system 1003. In an embodiment, the features, calculations, and/or determinations provided by examination element 1018 and/or cost calculation element 1020 may be incorporated into one or more processing elements, such as elements 1004, 1010, or 1012, and therefore such elements should not be limited to the illustrated embodiment. Also, the features, calculations, and/or determinations should not be restricted to receiving information from front end processing element 1004 and back end processing element 1010.

Examination element 1018 may be configured to examine the image data. The examination element 1018 may assist in determining the classification of the image data to be output. For example, the examination element 1018 may comprise a classification element 1024 that includes counters and/or comparators is configured to perform any of the counting/comparison steps in FIGS. 1 and/or 3 in device independent space. In an embodiment, these counters could be received from front end processing element 1004 and/or back end processing element 1010.

The examination element 1018 may operatively communicate with a cost calculation element 1020. The cost calculation element 1020 is configured to calculate a billing cost or an approximate cost for outputting the page and/or document of image data. The billing cost may be calculated and based on a determined billing structure. For example, if it is determined that a page is to be billed using a Tier-2 of a multi-tiered billing structure, the cost associated with Tier-2 may be employed. Moreover, a tier level adjustment element 1026 can be included in the system/apparatus in order to implement the method described herein (e.g., method 500 in FIG. 5) and perform adjustment from a selected billing tier to a different billing tier (within the billing structure) if it is determined based on at least the image classification that the image data to be output should be billed at a different tier level. Thus, before costs are calculated using cost calculation element 1020, the tier can be adjusted using tier level adjustment element 1026, if needed. In an embodiment, cost calculation element 1020 can receive input from other modules or elements, including input from back end processing element 1010, for example (e.g., it may receive pixel counts related to marking each of the CMYK inks).

In an embodiment, the billing cost is further calculated based on a type of output device to be used. For example, when copying using a printer or MFD, the chosen type of output device may alter the cost for printing the page or document due to the plurality of output modes, inks, toners, and other elements which contribute to the quality of the output document 1016. In an embodiment, the cost calculation element 1020 is configured to operatively communicate with the examination device 1018 and at least one of the processing elements (such as 1010 or 1012) to calculate a billing cost for outputting the page and/or document.

In a possible embodiment, examination element 1018 and cost calculation element 1020 are part of a billing system to be implemented by an operative set of processor executable instructions configured for execution by at least one processor or processing element. The instructions may be based on the herein disclosed algorithm and example calculations, for example. The billing system may be provided at a remote location with respect to the at least one processor. In an embodiment, the at least one processor is provided in an image processing apparatus, which may comprise an input device for inputting image data and an output device for outputting image data. In an embodiment, the at least one processor of the billing system is provided at a remote location with respect to an output device. As noted above, at least one processing element of system 1003 may implement the operative set of processor executable instructions of the billing system by communicating via the network 1022, for example. The at least one processing element may thus be provided in the same or a remote location with respect to the output device. In some cases, the examination element 1018 and/or cost calculation element 1020 may communicate an approximate cost or billing cost to the processor/system 1003. In some cases, the examination element 1018 and/or cost calculation element 1020 may be a part of the processor which communicates with system 1003 or an output device.

In a possible embodiment, the cost calculated by the cost calculation element 1020 (or its associated processing element) may be sent directly to the output device 1014. For example, as shown in FIG. 15, the cost calculation element 1020 may communicate via path 1007 the approximate billing cost to the output device 1014. In this case, the cost may be output via a display, screen, or even a print job. By providing the cost in such a manner—i.e., before outputting the image data via a printing or copying output device—the customer can decide if the image data should be marked via interface 1012 and output, or if the data should be saved/discarded (e.g., such as if the cost is too high). The customer may choose or select (e.g., see FIG. 1 at 118) to output the image data (e.g., via contact with network 1022 or system 1003) through the use of an activation button, for example.

Also, it is envisioned that an embodiment in accordance with this disclosure may include a system that utilizes a network connection 1022 for proposed billing estimates. For example, a customer may submit a proposed job (e.g., document) to a website such that a cost estimate for outputting (e.g., printing) the job may be provided to the customer via such website. In an embodiment, it is envisioned that the estimate of how much the job will cost may be determined by considering a predetermined type of printing apparatus for output. Depending on the type of device, apparatus, or machine used for output, the cost estimate of the job may differ. Additionally, in an embodiment, it is envisioned that the system and/or website may estimate theoretical costs of the job if the document is printed with alternative type of printing devices or apparatuses, and that such theoretical costs may be presented to the customer (e.g., via the website). These alternative types may include but are not limited to, different brands or types of machines (e.g., company make and model), different output resolutions/capabilities, or different print shops, for example. A system and/or website may utilize a method such as method 100 to estimate such costs, for example. The system may comprise similar elements noted with respect to the image path of the system 1000 in FIG. 15, including, but not limited to, a communication device (such as a network), examination element, cost calculation element, processor and processing elements, for example. The system may include a personal computer (PC) or display device for displaying an estimated cost being communicated via a connected network. The network may include any type of network such as the Internet, Wi-Fi, DSL, local area network (LAN), or wide area network (WAN), for example. Such a system is advantageous to a customer as it allows the customer to review theoretical costs before any actual printing or marking occurs. The customer is able to decide, based on a cost estimate, if the job should be output (e.g., printed), without actually outputting the job. Furthermore, the customer may make a decision whether or not to output a job based on types of printing machines. For example, if the system/website includes cost estimates for outputting the job using one or more devices or apparatuses, the customer has the option of choosing a device or apparatus should be used to output the document (or not used), based on the customer's pricing point.

With the herein disclosed methods, existing image paths may be easily altered. For example, neutral pixel and neutral page detection modules may already exist in the image path. As another example, an image path may be missing or have a capability at a different time than indicated. For example, an image path may not have a pixel counting capability prior to job storage. Therefore, a pixel counting module may be placed after job storage (e.g., after both a copy and print job processing) if so desired.

Other embodiments include incorporating the above methods into a set of computer executable instructions readable by a computer and stored on a data carrier or otherwise a computer readable medium, such that the method 100 (in FIG. 1) is automated. In a possible embodiment, the methods may be incorporated into an operative set of processor executable instructions configured for execution by at least one processor. FIGS. 1, 3, and 5-8 show flow charts of such computer readable, executable instructions that may be implemented by one or more processing elements/processors. For example, in some embodiments, memory or storage of an output device carrying instructions is configured such that when the executable instructions are executed by a computer or processor, they cause a computer or processor to automatically perform a method for determining a billing structure for outputting documents. Such instructions may be contained in memory, for example. In alternative embodiments, hard-wired circuitry may be used in place of or in combination with software instructions to implement the disclosure. Thus, embodiments of this disclosure are not limited to any specific combination of hardware circuitry and software. Any type of computer program product or medium may be used for providing instructions, storing data, message packets, or other machine readable information associated with the method 100. The computer readable medium, for example, may include non-volatile memory, such as a floppy, ROM, flash memory, disk memory, CD-ROM, and other permanent storage devices useful, for example, for transporting information, such as data and computer instructions. In any case, the medium or product should not be limiting.

In addition, it should be noted that the system/apparatus 1000 may include a display or control panel user interface (UI) that allows a customer to read the billing meter. Meter reads may be used for cost-per-copy pricing, for example. Such meter reads can be obtained by accessing the local user interface on the control panel, or, alternatively, by accessing a remote user interface using an Internet or web connection. For example, a simple interface may be provided that enables a customer or supplier to manage, configure, and monitor networked printers and MFDs from a desktop or laptop using an embedded web server. The location and accessibility of the billing meters on the display/control panel interface should not be limiting. For example, a user may scroll through a list of the billing plans that are available directly on the machine, as well as the billing costs associated therewith, or on a computer. In some cases, the billing meters can also be viewed on a usage profile report. Such a report may be printed or electronic. In the case of an electronic report, for example, one may access such information via a network and an appropriate Internet Protocol (IP) address associated with the device. This information may be accessed via a browser. In an embodiment, the device or system updates the usage in real time. Thus, the billing meters that are accessible via a remote location will match the billing meters of the user interface and its displayed counters.

While the principles of the disclosure have been made clear in the illustrative embodiments set forth above, it will be apparent to those skilled in the art that various modifications may be made to the structure, arrangement, proportion, elements, materials, and components used in the practice of the disclosure. For example, the system 1003 may be a computer system which includes a bus or other communication mechanism for communicating information, and one or more of its processing elements may be coupled with the bus for processing information. Also, the memory 1006 may comprise random access memory (RAM) or other dynamic storage devices and may also be coupled to the bus as storage for the executable instructions. Storage device 1008 may include read only memory (ROM) or other static storage device coupled to the bus to store executable instructions for the processor or computer. Alternatively, another storage device, such as a magnetic disk or optical disk, may also be coupled to the bus for storing information and instructions. Such devices are not meant to be limiting.

While this disclosure has been described in connection with what is presently considered to be the most practical and preferred embodiments, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertains, and as may be applied to the essential features hereinbefore set forth and followed in the spirit and scope of the appended claims.

It will be appreciated that various of the above-disclosed and other features and functions, or alternatives thereof, may be desirably combined into many other different systems/devices or applications. Various presently unforeseen or unanticipated alternatives, modifications, variations, or improvements therein may be subsequently made by those skilled in the art which are also intended to be encompassed by the following claims.

What is claimed is:

1. A processor-implemented method for processing image data comprising:
   using an image processing apparatus, the image processing apparatus comprising at least one processor for processing documents containing image data comprising a plurality of pixels, using the image processing apparatus comprising the following acts being implemented by the at least one processor:
   providing a billing structure comprising a plurality of original billing tiers defined by predetermined thresholds at which to bill image data;
   receiving image data of a document comprising a plurality of pixels including color pixels;
   determining pixel classifications of the color pixels for each pixel classification in the image data in device independent space;
   determining counts of the color pixels for each determined pixel classification in the image data in device independent space;
   classifying the image data as a whole into a category or class based on both of the determination of the pixel classifications and the determined counts; then
   converting the plurality of pixels of the image data into a plurality of pixels in device dependent space before determining counts of pixels for marking the image data;
   determining counts of color pixels in device dependent space for marking to output the image data;
   selecting one billing tier from the plurality of original billing tiers for which to bill the image data, and, then, after the selection of the one billing tier,
   adjusting from the selected one billing tier to a different billing tier for which to bill the image data using at least both of the category or class of the image data that is determined in device independent space and the determined counts of color pixels for marking determined in device dependent space,
   wherein the determined pixel classification and counts are determined by applying a neutral pixel determination algorithm and/or a neutral page determination algorithm to the image data in device independent space.

2. The method according to claim 1, wherein the adjusting from the selected billing tier further comprises using the determined counts of pixels for each determined pixel classification and the determined counts of pixels for marking to determine the different billing tier.

3. The method according to claim 1, wherein the determining of pixel classifications and counts in device independent space comprises counting at least a number of true color pixels and fuzzy color pixels in the image data.

4. The method according to claim 3, wherein the determining of counts of pixels in device dependent space for marking comprises counting a number of C, M, and Y pixels in the image data for marking.

5. The method according to claim 4, wherein the adjusting from the selected one billing tier comprises comparing the determined counts of the at least the number of true color pixels and of the fuzzy color pixels for each pixel classification to one or more predetermined thresholds and/or comparing the determined counts of the number of C, M, and Y pixels to one or more predetermined marking thresholds to determine the different billing tier.

6. The method according to claim 1, wherein the method further comprises comparing the determined counts of pixel classifications and counts for each pixel classification to one or more predetermined thresholds and comparing the determined counts of the pixels for marking to one or more predetermined marking thresholds, and wherein the adjusting from the selected billing tier to the different billing tier is based on results of the comparisons.

7. The method of claim 1, wherein the method further comprises determining a count of pixels for billing based on the determined counts of pixels for each determined pixel classification and the determined counts of pixels for marking, and adjusting from the selected billing tier to the different billing tier based on the count of pixels for billing.

8. The method according to claim 1, wherein the selecting the one billing tier from the plurality of original billing tiers is based on the classification of image data in device independent space.

9. The method according to claim 1, wherein the selecting the one billing tier from the plurality of original billing tiers is based on the determined count of color pixels in device dependent space for marking.

10. A system for processing image data comprising:
    an input device for receiving a document containing image data, the image data comprising a plurality of pixels;
    at least one processing element for processing the pixels of the image data, each processing element comprising an input and an output; and
    an output device for outputting the document,
    wherein the at least one processing element is configured to: provide a billing structure comprising a plurality of original billing tiers defined by predetermined thresholds at which to bill image data; receive image data of a document comprising a plurality of pixels including color pixels; determine pixel classifications of the color pixels for each pixel classification in the image data in device independent space; determine counts of the color pixels for each determined pixel classification in the image data in device independent space; classify the image data as a whole into a category or class based on both of the determination of the pixel classifications and the determined counts; then, convert the plurality of pixels of the image data into a plurality of pixels in device dependent space before determining counts of pixels for marking; determine counts of color pixels in device dependent space for marking to output the image data; select one billing tier from the plurality of original billing tiers for which to bill the image data, and, then, after the selection of the one billing tier, adjust from the selected one billing tier to a different billing tier for which to bill the image data using at least both of the category or class of the image data that is determined in device independent space and the determined counts of color pixels for marking determined in device dependent space, wherein the determined pixel classification and counts are determined by applying a neutral pixel determination algorithm and/or a neutral page determination algorithm to the image data in device independent space.

11. The system according to claim 10, further comprising:
a cost calculation element for calculating a billing cost for outputting the page and/or document based on the adjusted and different billing tier.

12. The system according to claim 10, wherein the at least one processing element is further configured to compare the determined counts of pixel classifications and counts for each pixel classification to one or more predetermined thresholds and compare the determined counts of the pixels for marking to one or more predetermined marking thresholds, and wherein the adjustment from the selected billing tier to the different billing tier is based on results of the comparisons.

13. The system according to claim 10, wherein the at least one processing element is further configured to determine a count of pixels for billing based on the determined counts of pixels for each determined pixel classification and the determined counts of pixels for marking, and adjust from the selected billing tier to the different billing tier based on the count of pixels for billing.

14. The system according to claim 10, wherein the input device is selected from the group consisting of: an image input terminal, a scanner, a memory device, and a storage device.

15. The system according to claim 10, wherein the output device is selected from the group consisting of: an image output terminal, a display, a printing device, a copying device, a facsimile machine, a network, and a multi-function device.

16. The system according to claim 10, wherein the input device, the at least one processing element, and the output device are provided within an image processing apparatus.

17. The system according to claim 10, wherein the adjusting from the selected billing tier by the processing element further comprises using the determined counts of pixels for each determined pixel classification and the determined counts of pixels for marking to determine the different billing tier.

18. The system according to claim 10, wherein the selection of the one billing tier from the plurality of original billing tiers by the at least one processing element comprises a selection based on the classification of image data in device independent space.

19. The system according to claim 10, wherein the selection of the one billing tier from the plurality of original billing tiers by the at least one processing element comprises a selection based on the determined count of color pixels in device dependent space for marking.

20. A non-transitory computer readable medium having stored thereon computer executable instructions, wherein the computer executable instructions, when executed by a computer, direct the computer to perform a method for processing image data, the method comprising:
providing a billing structure comprising a plurality of original billing tiers defined by predetermined thresholds at which to bill image data;
receiving image data of a document comprising a plurality of pixels including color pixels;
determining pixel classifications of the color pixels for each pixel classification in the image data in device independent space;
determining counts of the color pixels for each determined pixel classification in the image data in device independent space;
classifying the image data as a whole into a category or class based on both of the determination of the pixel classifications and the determined counts; then
converting the plurality of pixels of the image data into a plurality of pixels in device dependent space before determining counts of pixels for making the image data;
determining counts of color pixels for marking in device dependent space to output the image data;
selecting one billing tier from the plurality of original billing tiers for which to bill the image data, and, then, after the selection of the one billing tier,
adjusting from the selected one billing tier to a different billing tier for which to bill the image data using at least both of the category or class of the image data that is determined in device independent space and the determined counts of color pixels for marking determined in device dependent space,
wherein the determined pixel classification and counts are determined by applying a neutral pixel determination algorithm and/or a neutral page determination algorithm to the image data in device independent space.

21. The medium according to claim 20, wherein the method executed by the computer further comprises comparing the determined counts of pixel classifications and counts for each pixel classification to one or more predetermined thresholds and comparing the determined counts of the pixels for marking to one or more predetermined marking thresholds, and wherein the adjusting from the selected billing tier to the different billing tier is based on results of the comparisons.

22. The medium according to claim 20, wherein the method executed by the computer further comprises determining a count of pixels for billing based on the determined counts of pixels for each determined pixel classification and the determined counts of pixels for marking, and adjusting from the selected billing tier to the different billing tier based on the count of pixels for billing.

23. The medium according to claim 20, wherein the method executed by the computer further comprises adjusting from the selected billing tier further comprises using the determined counts of pixels for each determined pixel classification and the determined counts of pixels for marking to determine the different billing tier.

24. The medium according to claim 20, wherein the determining of pixel classifications and counts in device independent space comprises counting at least a number of true color pixels and fuzzy color pixels in the image data.

25. The medium according to claim 24, wherein the determining of counts of pixels in device dependent space for marking comprises counting a number of C, M, and Y pixels in the image data for marking.

26. The medium according to claim 25, wherein the adjusting from the selected one billing tier comprises comparing the determined counts of the at least the number of true color pixels and of the fuzzy color pixels for each pixel classification to one or more predetermined thresholds and/or comparing the determined counts of the number of C, M, and Y pixels to one or more predetermined marking thresholds to determine the different billing tier.

27. The medium according to claim 20, wherein the selecting the one billing tier from the plurality of original billing tiers in the method executed by the computer further comprises selecting the one billing tier based on the classification of image data in device independent space.

28. The medium according to claim 20, wherein the selecting the one billing tier from the plurality of original billing tiers in the method executed by the computer further comprises selecting the one billing tier based on the determined count of color pixels in device dependent space for marking.

* * * * *